(12) United States Patent
Kida et al.

(10) Patent No.: US 11,860,468 B2
(45) Date of Patent: Jan. 2, 2024

(54) IN-CELL TOUCH PANEL WITH ELECTRODE GAP OVERLAPPING COLOR FILTER

(71) Applicant: Sharp Display Technology Corporation, Kameyama (JP)

(72) Inventors: Kazutoshi Kida, Kameyama (JP); Kiyoshi Minoura, Kameyama (JP); Takashi Satoh, Kameyama (JP); Shunsuke Noichi, Kameyama (JP); Yasuhiro Sugita, Kameyama (JP); Chiaki Minari, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 17/752,574

(22) Filed: May 24, 2022

(65) Prior Publication Data

US 2022/0382099 A1 Dec. 1, 2022

(30) Foreign Application Priority Data

May 26, 2021 (JP) ................. 2021-088572

(51) Int. Cl.
| | | |
|---|---|---|
| *G02F 1/13* | (2006.01) |
| *G02F 1/1335* | (2006.01) |
| *G02F 1/1333* | (2006.01) |
| *G02F 1/1343* | (2006.01) |
| *G06F 3/041* | (2006.01) |
| *G06F 3/044* | (2006.01) |
| *G02F 1/1362* | (2006.01) |
| *G02F 1/133* | (2006.01) |

(52) U.S. Cl.
CPC .... *G02F 1/133519* (2021.01); *G02F 1/13338* (2013.01); *G02F 1/133553* (2013.01); *G02F 1/134309* (2013.01); *G02F 1/136286* (2013.01); *G06F 3/0412* (2013.01); *G06F 3/0446* (2019.05); *G02F 1/13306* (2013.01); *G02F 2201/52* (2013.01)

(58) Field of Classification Search
CPC .... G06F 3/0412; G06F 3/0445; G06F 3/0446; G06F 3/0416; G02F 1/13338; G02F 1/133553
See application file for complete search history.

(56) References Cited

U.S. PATENT DOCUMENTS

2012/0056835 A1 3/2012 Choo et al.
2014/0043288 A1\* 2/2014 Kurasawa ............. G06F 3/0412
345/174

(Continued)

FOREIGN PATENT DOCUMENTS

JP 2012-059265 A 3/2012

*Primary Examiner* — Liliana Cerullo
(74) *Attorney, Agent, or Firm* — ScienBiziP, P.C.

(57) ABSTRACT

An in-cell touch panel device includes a first substrate, a plurality of color filters formed on an upper layer with respect to the first substrate and including a green color filter, a transmitter electrode formed on an upper layer with respect to the plurality of color filters, a receiver electrode formed on a lower layer with respect to the plurality of color filters, and a second substrate including a pixel electrode disposed on the second substrate. The transmitter electrode includes a gap portion formed in a portion overlapping the receiver electrode in a plan view and in a portion overlapping the green color filter in a plan view.

15 Claims, 31 Drawing Sheets

(56) References Cited

U.S. PATENT DOCUMENTS

| | | | |
|---|---|---|---|
| 2017/0060309 A1* | 3/2017 | Chen | G02F 1/133514 |
| 2019/0018530 A1* | 1/2019 | Lee | H10K 50/8445 |
| 2019/0121180 A1* | 4/2019 | Ohashi | G06F 3/0412 |
| 2019/0258108 A1* | 8/2019 | Xie | G06F 3/0445 |
| 2019/0339557 A1* | 11/2019 | Tominaga | G02F 1/13338 |
| 2020/0119113 A1* | 4/2020 | Lee | H10K 50/8445 |

\* cited by examiner

IN-CELL TOUCH PANEL WITH ELECTRODE GAP OVERLAPPING COLOR FILTER

CROSS-REFERENCE TO RELATED APPLICATIONS

This application claims the benefit of priority to Japanese Patent Application Number 2021-088572 filed on May 26, 2021. The entire contents of the above-identified application are hereby incorporated by reference.

BACKGROUND

Technical Field

The disclosure relates to an in-cell touch panel.

In the related art, an in-cell touch panel including a touch panel is known. Such an in-cell touch panel is disclosed in, for example, JP 2012-059265 A.

The in-cell touch panel of JP 2012-059265 A includes a thin film transistor substrate, a touch sensor array, a thin film transistor array, a color filter substrate, and a color filter array. The touch sensor array and the thin film transistor array are formed on the thin film transistor substrate. The color filter array is formed on the color filter substrate. The in-cell touch panel alternately executes, in one frame period, a display mode in which the thin film transistor array is driven and a touch sensing mode in which the touch sensor array is driven.

SUMMARY

Here, a touch panel according to a mutual capacitance type is known, in which a transmitter electrode and a receiver electrode are provided in the touch sensor array, and a change in mutual capacitance between the transmitter electrode and the receiver electrode due to a touch by a pointer is measured. However, in the touch panel according to the mutual capacitance type, light for performing display needs to transmit two layers of the transmitter electrode and the receiver electrode. Thus, there is a problem in that the light is absorbed or scattered when transmitting the transmitter electrode and the receiver electrode, and brightness of the touch panel is decreased.

The disclosure has been conceived in order to solve the problem described above and aims to provide an in-cell touch panel capable of causing a user feel a display bright even when a touch panel of a mutual capacitance type is provided.

In order to solve the problem described above, an in-cell touch panel according to an aspect of the disclosure includes a first substrate, a plurality of color filters formed on the first substrate, a transmitter electrode formed on one of a layer on an opposite side of a touch surface with respect to the plurality of color filters and a layer closer to the touch surface side with respect to the plurality of color filters, a receiver electrode formed on the other of the layer on the opposite side of the touch surface with respect to the plurality of color filters and the layer closer to the touch surface side with respect to the plurality of color filters, and a second substrate disposed to face the first substrate and including a pixel electrode disposed on the second substrate, wherein the plurality of color filters include a blue color filter, a red color filter, and a green color filter, and at least one of the transmitter electrode and the receiver electrode includes a first gap portion formed in at least a part of a portion overlapping the green color filter in a plan view.

Here, among green, red, and blue, green has the highest luminosity factor for humans. In contrast, according to the above-described configuration, at least one of the transmitter electrode and the receiver electrode is not provided at a position overlapping the green color filter for transmitting green light whose brightness and darkness are easily perceived by the humans. As a result, it is possible to reduce loss of green light whose brightness and darkness are easily perceived by the humans, and thus the in-cell touch panel capable of causing a user to feel a display bright even when a touch panel of a mutual capacitance type is provided can be provided.

BRIEF DESCRIPTION OF DRAWINGS

The disclosure will be described with reference to the accompanying drawings, wherein like numbers reference like elements.

DESCRIPTION OF EMBODIMENTS

Figure 1:
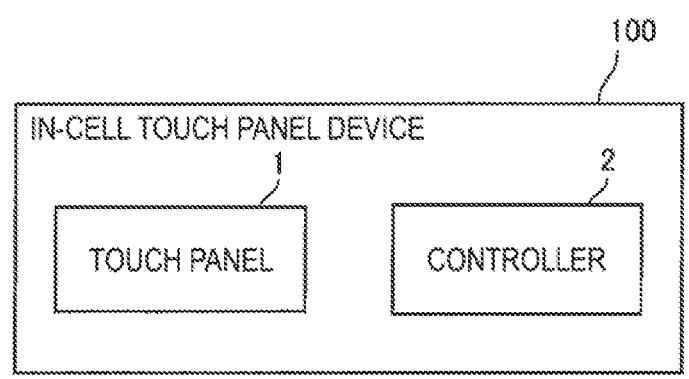
FIG. 1 is a block diagram illustrating a functional configuration of an in-cell touch panel device 100 according to a first embodiment.

Hereinafter, embodiments of the disclosure will be described in detail with reference to the drawings. In the drawings, the same or corresponding portions are denoted by the same reference numerals and signs, and the description thereof will not be repeated. Note that, for ease of description, in the drawings referred to below, configurations may be simplified or schematically illustrated, and some components may be omitted. Furthermore, dimensional ratios between components illustrated in the drawings are not necessarily indicative of actual dimensional ratios.

First Embodiment

Figure 2:
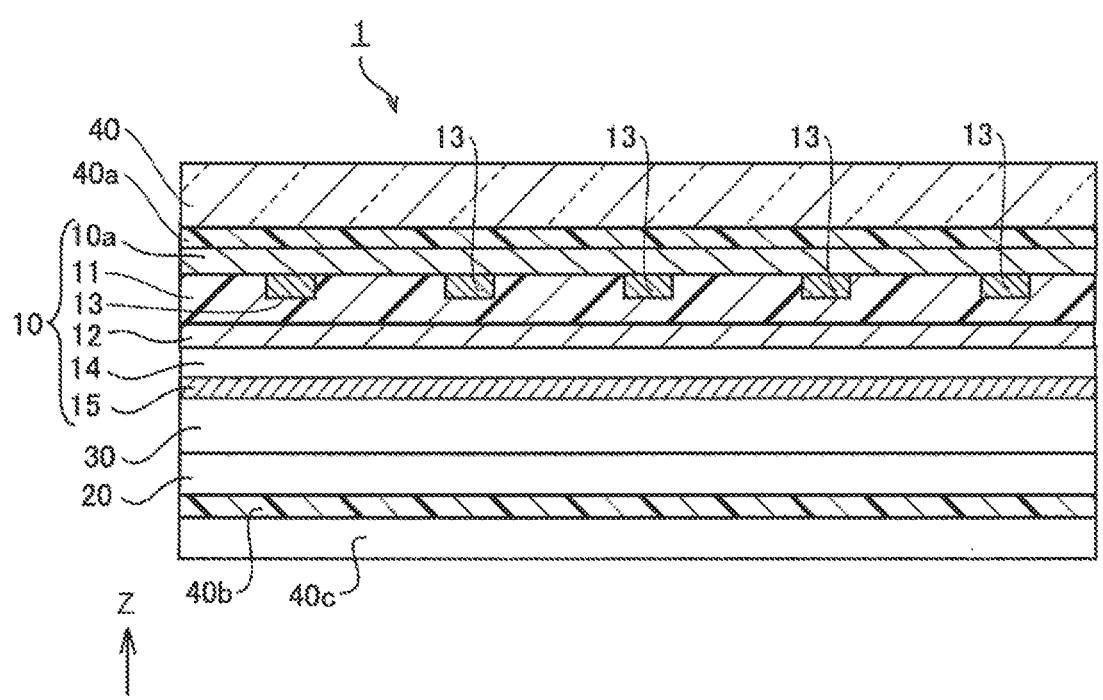
FIG. 2 is a cross-sectional view of a touch panel 1 according to the first embodiment.

A configuration of an in-cell touch panel device 100 according to a first embodiment will be described. FIG. 1 is a block diagram illustrating a functional configuration of the in-cell touch panel device 100 according to the first embodiment. FIG. 2, is a cross-sectional view of a touch panel 1 according to the first embodiment.

As illustrated in FIG. 1, the in-cell touch panel device 100 includes the touch panel 1 and a controller 2. The touch panel 1 is, for example, a full in-cell type touch panel. The touch panel 1 also functions as a display panel for displaying a video or an image. The controller 2 includes a processor executing each control process in the in-cell touch panel device 100, based on a touch position acquired from the touch panel 1. Furthermore, the touch panel 1 is configured as a memory-in-pixel (MIP) type display in which a memory circuit 62 (see FIG. 7) is disposed in each of a plurality of pixels 60 (see FIG. 7).

As illustrated in FIG. 2, the touch panel 1 includes a color filter substrate 10, an active matrix substrate 20 disposed to face the color filter substrate 10, and a liquid crystal layer 30 interposed between the color filter substrate 10 and the active matrix substrate 20. Furthermore, a pair of polarizers 40a and 40b are provided to sandwich the color filter substrate 10 and the active matrix substrate 20. Furthermore, a cover glass 40 is provided on a front side (a touch surface side being touched by the pointer) of the color filter substrate 10 via the polarizer 40a. Furthermore, a backlight 40c is provided on a rear side of the active matrix substrate 20 via the polarizer 40b. Note that the "touch surface" in the disclosure refers to a front face of the color filter substrate 10 (front face of the cover glass 40).

Here, in the first embodiment, as illustrated in FIG. 2, the color filter substrate 10 includes a first substrate 10a, a color filter 11, a transmitter electrode 12, a receiver electrode 13, an overcoat film 14, and a common electrode 15. The color filter 11 is formed on an upper layer with respect to the first substrate 10a. Note that in the specification of the present application, a description is given by assuming that "upper" in the color filter substrate 10 refers to the liquid crystal layer 30 side (an opposite side of the touch surface), and "lower" in the color filter substrate 10 refers to the cover glass 40 side (touch surface side). Furthermore, a description is given by assuming that "upper" in the active matrix substrate 20 refers to the liquid crystal layer 30 side (touch surface side), and "lower" refers to the backlight 40c side (an opposite side of the touch surface).

The color filter 11 is formed on an upper layer with respect to the first substrate 10a. The transmitter electrode 12 is formed on the upper layer of the color filter 11. The receiver electrode 13 is formed on the lower layer of the color filter 11. The overcoat film 14 is formed on the upper layer with respect to the color filter 11 and on the upper layer with respect to the transmitter electrode 12. The common electrode 15 is formed on the upper layer with respect to the overcoat film 14. Here, in a case where at least one of the transmitter electrode or the receiver electrode is formed closer to the active matrix substrate 20 side (upper layer) with respect to the common electrode 15, an electric field formed between the transmitter electrode or the receiver electrode formed on the upper layer and the pointer is shielded by the common electrode 15 in contrast, according to the configuration described above, the common electrode 15 is formed on the upper layer with respect to the transmitter electrode 12 and the receiver electrode 13, and thus the electric field formed between the transmitter electrode 12 or the receiver electrode 13 and the pointer can be prevented from being shielded by the common electrode 15. As a result, even when the liquid crystal layer 30 is driven by the vertical alignment (VA) type, a VA type display can be configured as the in-cell touch panel device 100.

Figure 3:
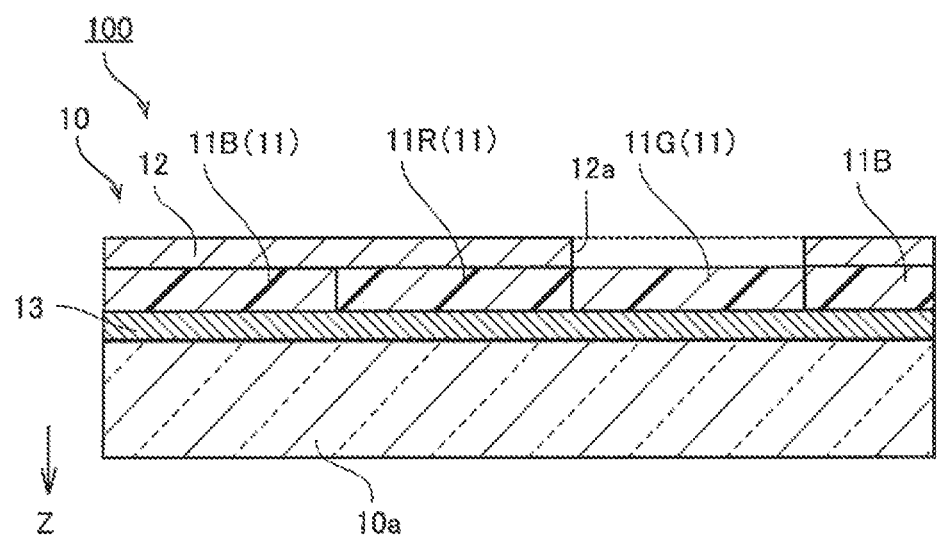
FIG. 3 is a cross-sectional view of a portion of a color filter substrate 10 for describing a configuration of a transmitter electrode 12 and a receiver electrode 13.

FIG. 3 is a cross-sectional view of a portion of the color filter substrate 10 for describing a configuration of the transmitter electrode 12 and the receiver electrode 13. The first substrate 10a is, for example, a glass substrate having insulating properties. As illustrated in FIG. 3, a plurality of the color filters 11 are provided. Each of the plurality of color filters 11 includes a color resist. The plurality of color filters 11 include a green color filter 11G, a red color filter 11R, and a blue color filter 11B. Here, a black matrix is not provided between adjacent ones of the plurality of color filters 11. As a result, a decrease in brightness of the touch panel 1 due to the black matrix is prevented. Furthermore, in the first embodiment, the adjacent ones of the color filters 11 are in contact with each other.

The transmitter electrode 12, the receiver electrode 13, and the common electrode 15 are formed of, for example, a transparent electrode (indium tin oxide (ITO), for example). Furthermore, the overcoat film 14 illustrated in FIG. 2 is formed of a transparent resin material. The common electrode 15 is disposed to face a pixel electrode 21 (see FIG. 4) of the active matrix substrate 20, and generates an electric field between the pixel electrode 21 and the common electrode 15. The common electrode 15 is provided in common to a plurality of the pixel electrodes 21. As a result, the touch panel 1 according to the first embodiment is driven by the VA type.

Figure 4:
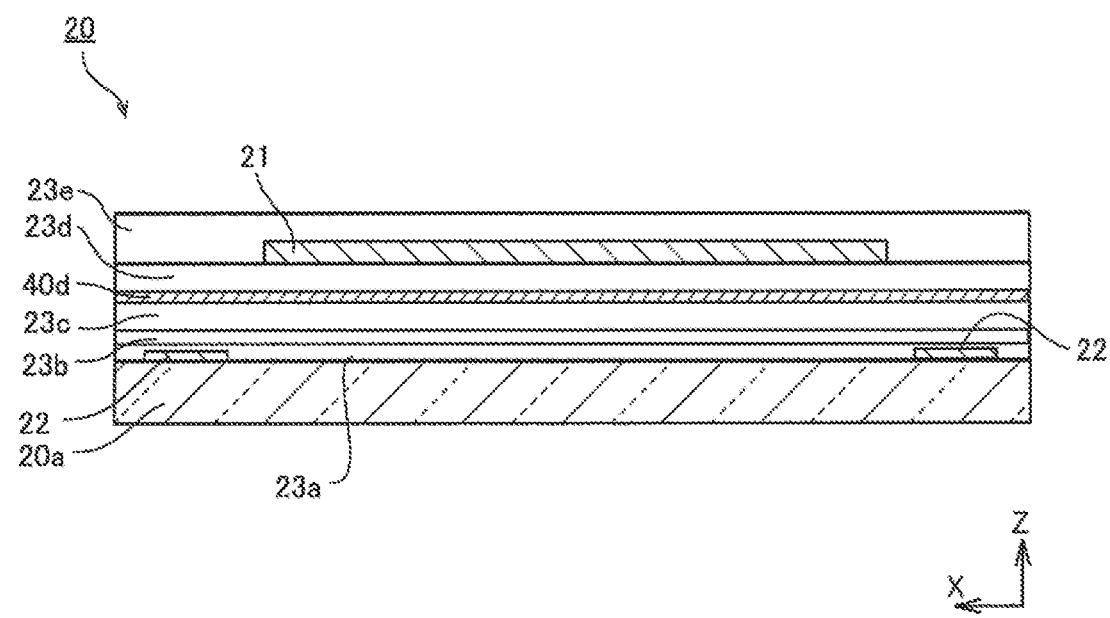
FIG. 4 is a cross-sectional view of an active matrix substrate 20 along an X direction.
Figure 5:
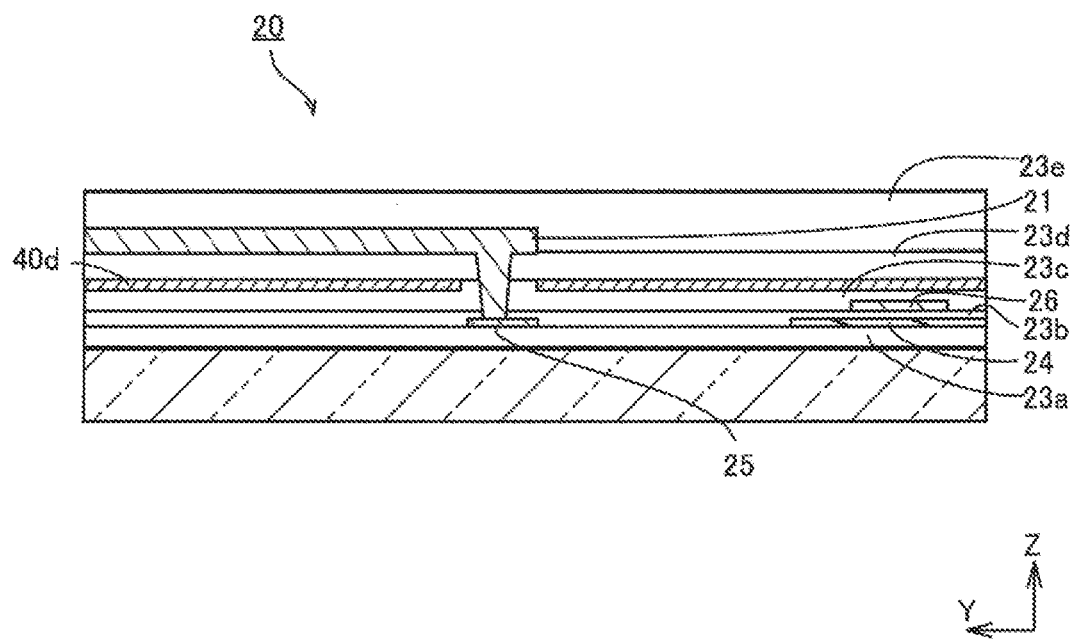
FIG. 5 is a cross-sectional view of the active matrix substrate 20 along a Y direction.
Figure 6:
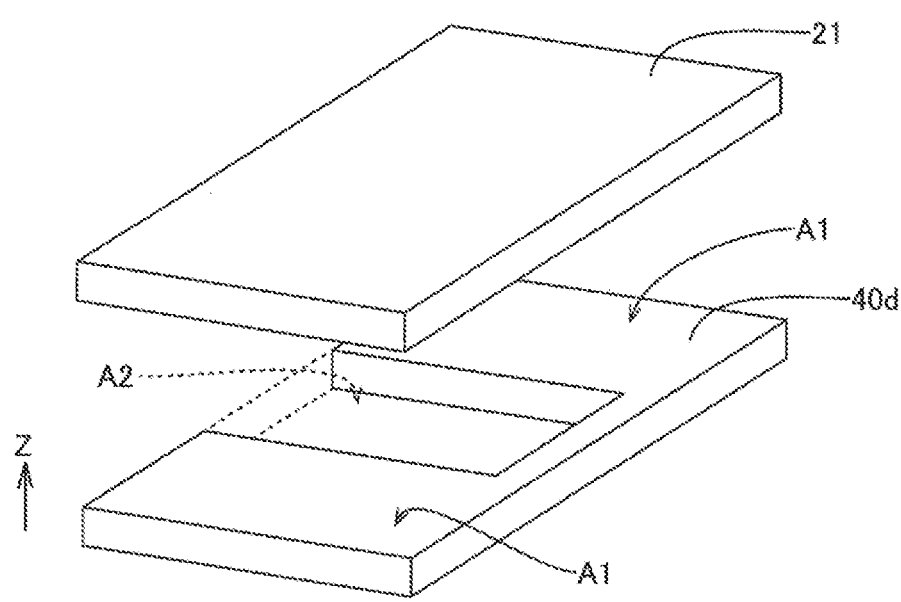
FIG. 6 is a schematic view for describing a reflective region A1 and a transmission region A2 in the touch panel 1.

FIG. 4 is a cross-sectional view of the active matrix substrate 20 along an X direction. FIG. 5 is a cross-sectional view of the active matrix substrate 20 along a Y direction. FIG. 6 is a schematic view for describing a reflective region A1 and a transmission region A2 in the touch panel 1. As illustrated in FIG. 4, the active matrix substrate 20 is provided with a reflector 40d, and the touch panel 1 is configured as a reflection type display. Accordingly, the touch panel 1 according to the first embodiment is a hybrid type touch panel of a reflection type and a transmission type for displaying an image or a video, using reflected light by the reflector 40d and light (transmitted light) from the backlight 40c.

As illustrated in FIG. 2, the backlight 40c is provided on a rear face of the polarizer 40b. The reflector 40d reflects light incident from the color filter substrate 10 side. Furthermore, the backlight 40c emits light on the color filter substrate 10 side. As illustrated in FIG. 6, the reflector 40d includes the reflective region A1 and the transmission region A1. For example, a recessed portion (or hole portion) through which light from the backlight 40c passes though in a 21 direction is formed in a central portion in the reflector 40d in a plan view, and the recessed portion (or the hole portion) functions as the transmission region A2. By driving the liquid crystal layer 30, a state in which the light reflected by the reflective region A1 and the light transmitted through the transmission region A2 transmit through the liquid crystal layer 30 and a state in which the lights described above diffuse are switched. Note that FIGS. 4 and 5 are cross-sectional views in the reflective region A1.

As illustrated in FIGS. 4 and 5, a second substrate 20a, a source bus line 22, a first insulating layer 23a, a semiconductor layer 24, a memory connection line 25, a second insulating layer 23b, a gate bus line 26, a third insulating layer 23c, a reflector 40d, a fourth insulating layer 23d, the pixel electrodes 21, and a fifth insulating layer 23e are disposed on the active matrix substrate 20 in this order from the backlight 40c side. The second substrate 20a is, for example, a glass substrate having insulating properties. The pixel electrode 21 is formed of, for example, a transparent electrode (ITO). The source bus line 22, the memory connection line 25, and the gate bus line 26 contain a metal material (for example, aluminum, titanium, copper, or the like). Each of the first insulating layer 23a to the fifth insulating layer 23e is an insulating film made of an inorganic material or an organic material. The reflector 40d is formed of, for example, a metal material having light reflectivity. For example, the reflector 40d contains aluminum or an aluminum alloy. As illustrated in FIG. 5, the pixel electrode 21 is connected to the memory connection line 25.

Figure 7:
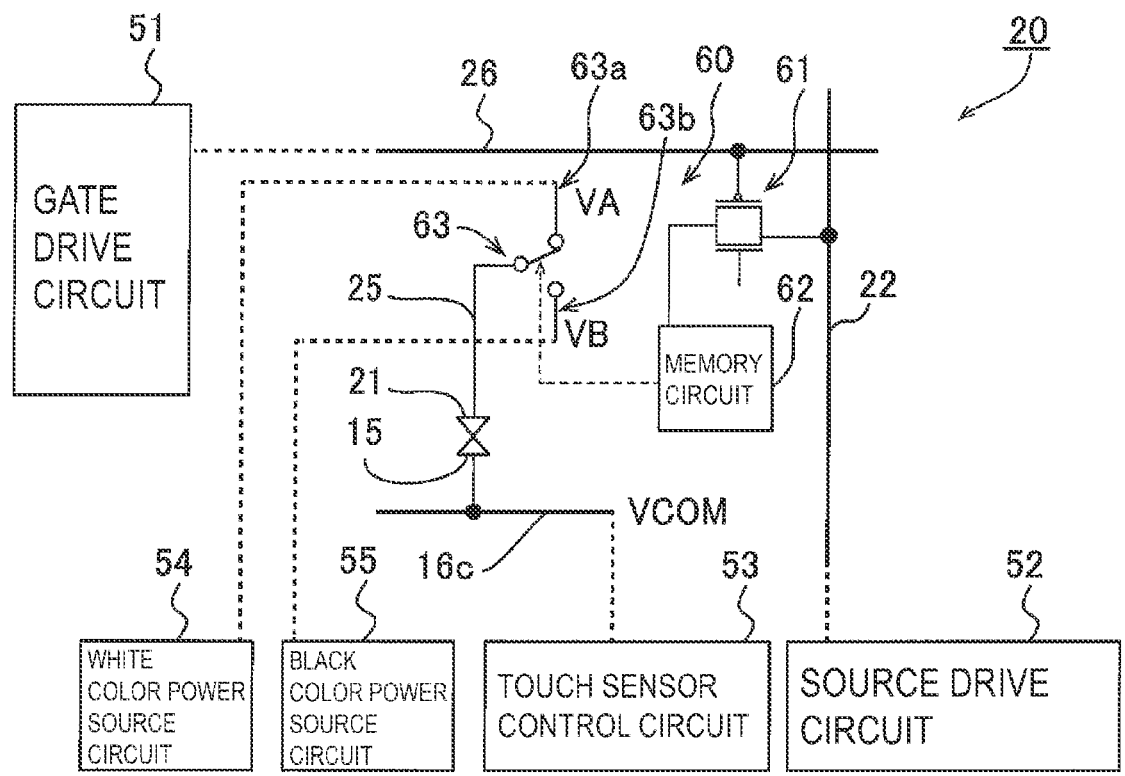
FIG. 7 is a view for describing a connection relationship between each circuit and a pixel 60 in the active matrix substrate 20.

FIG. 7 is a view for describing a connection relationship between each circuit and the pixel 60 in the active matrix substrate 20. A plurality of the gate bus lines 26 and a plurality of the source bus lines 22 intersect with each other and are formed in a lattice pattern (not illustrated) in a plan view. Furthermore, the pixels 60, each of which is a region partitioned by corresponding ones of the plurality of gate bus lines 26 and corresponding ones of the plurality of source bus lines 22, are formed in a matrix shape on the active matrix substrate 20. As illustrated in FIG. 7, a gate drive circuit 51, a source drive circuit 52, a touch sensor control circuit 53, a white color power source circuit 54, and a black color power source circuit 55 are provided on the active matrix substrate 20. The touch sensor control circuit 53, the white color power source circuit 54, and the black color power source circuit 55 are configured as, for example, one or more integrated circuits. Furthermore, the pixel 60 is provided with a thin film transistor 61, a memory circuit 62, and a switching element 63.

A gate electrode of the thin film transistor 61 is connected to the gate bus line 26, and a source electrode of the thin film transistor 61 is connected to the source bus line 22. Furthermore, a drain electrode of the thin film transistor 61 is connected to the memory circuit 62. The memory circuit 62 includes, for example, a 1 bit static random access memory (SRAM). The switching element 63 switches a state in which the pixel electrode 21 and a first wiring line 63a are connected to each other and a state in which the pixel electrode 21 and a second wiring line 63b are connected to each other, in accordance with a command from the memory circuit 62. The memory circuit 62 operates the switching element 63 based on data (data held in the memory circuit 62) written by the source drive circuit 52 via the thin film transistor 61. A gate signal is supplied from the gate drive circuit 51 to the memory circuit 62, the thin film transistor 61 is turned on, and thus data ("0" or "1") according to a source signal from the source drive circuit 52 is written.

As illustrated in FIG. 7, the touch sensor control circuit 53 is connected to the common electrode 15 via the signal line 16c. The white color power source circuit 54 is connected to the first wiring line 63a. The black color power source circuit 55 is connected to the second wiring line 63b. As a result, a voltage is constantly supplied to the pixel electrode 21 via the memory connection line 25 and the first wiring line 63a or the second wiring line 63b.

Figure 8:
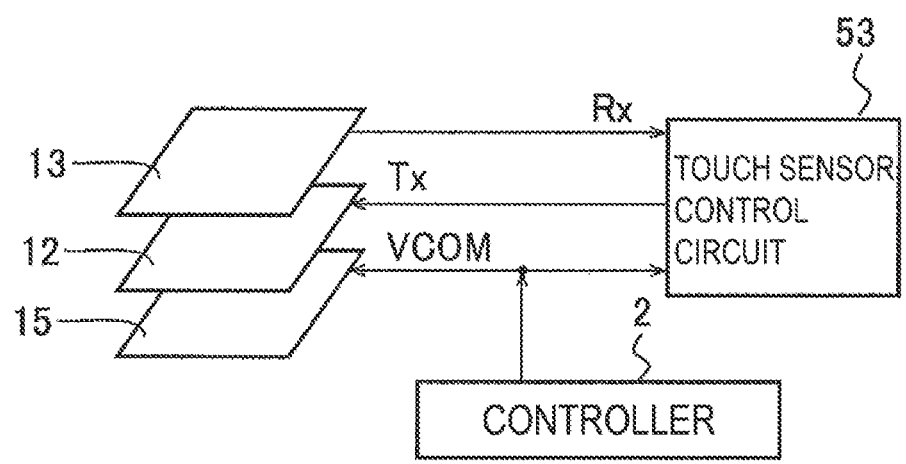
FIG. 8 is a schematic view for describing connections of the transmitter electrode 12, the receiver electrode 13, and a common electrode 15 to a touch sensor control circuit 53 and a controller 2.
Figure 9:
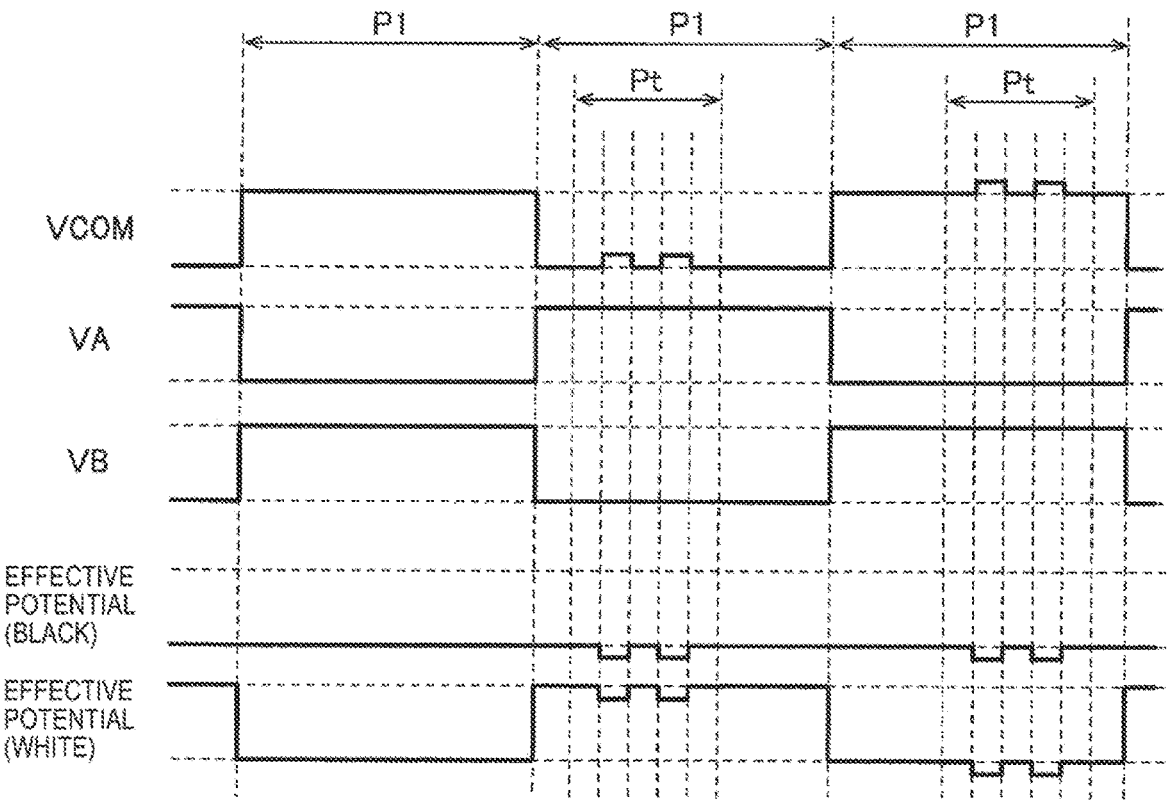
FIG. 9 is a timing chart for describing an effective potential of a pixel electrode 21 with respect to the common electrode 15.

FIG. 8 is a schematic view for describing connections of the transmitter electrode 12, the receiver electrode 13, and the common electrode 15 to the touch sensor control circuit 53 and the controller 2. FIG. 9 is a timing chart for describing an effective potential of the pixel electrode 21 with respect to the common electrode 15. As illustrated in FIG. 8, the controller 2, the touch sensor control circuit 53, and the common electrode 15 are connected to each other. A synchronization signal is supplied from the controller 2 to the touch sensor control circuit 53. The touch sensor control circuit 53 supplies a voltage VCOM to the common electrode 15, based on the synchronization signal. The voltage VCOM is a reference voltage with respect to a potential of the pixel electrode 21, and the liquid crystal layer 30 is driven by a potential difference between the potential of the pixel electrode 21 and the voltage VCOM. Furthermore, a polarity of the voltage VCOM is inverted for each predetermined period P1. In other words, a common electrode control circuit 53a performs COM inversion driving of the common electrode 15. Specifically, the "voltage VCOM" alternately repeats a state of a potential of High and a state of a potential of Low for each predetermined period P1.

Furthermore, the touch sensor control circuit 53 supplies a drive signal Tx to the transmitter electrode 12 within a period in which the data is written into the memory circuit 62. In other words, as illustrated in FIG. 9, in the in-cell touch panel device 100 according to the first embodiment, the period P1 for performing display and a touch sensor period. Pt for performing a touch detection are not time-divided. The touch sensor control circuit 53 supplies the drive signal Tx to the transmitter electrode 12 in the touch sensor period Pt serving as a part of the period P1. As a result, it is not necessary to design a drive circuit in accordance with the in-cell touch panel device 100 including the memory circuit 62, and thus a general-purpose drive circuit can be used as the touch sensor control circuit 53, and versatility of the in-cell touch panel device 100 can be improved. The "drive signal Tx" is, for example, a signal for inverting the polarity of the voltage a plurality of times in the touch sensor period Pt. As illustrated in FIG. 9, the transmitted electrode 12 and the common electrode 15 are capacitively coupled to each other, and thus the voltage VCOM is slightly changed, and the effective potential of the pixel electrode 21 with respect to the common electrode 15 is slightly changed, but there is a little influence on the display.

As illustrated in FIG. 8, the touch sensor control circuit 53 acquires a detection signal Rx from the receiver electrode 13. In a case where the pointer touches the touch panel 1, the mutual capacitance between the transmitter electrode 12 and the receiver electrode 13 changes, and a waveform of the detection signal Rx fluctuates. The touch sensor control circuit 53 acquires the mutual capacitance, based on the detection signal Rx, and detects the touch. Then, the touch sensor control circuit 53 transmits coordinates in which the touch is detected to the controller 2.

Figure 10:
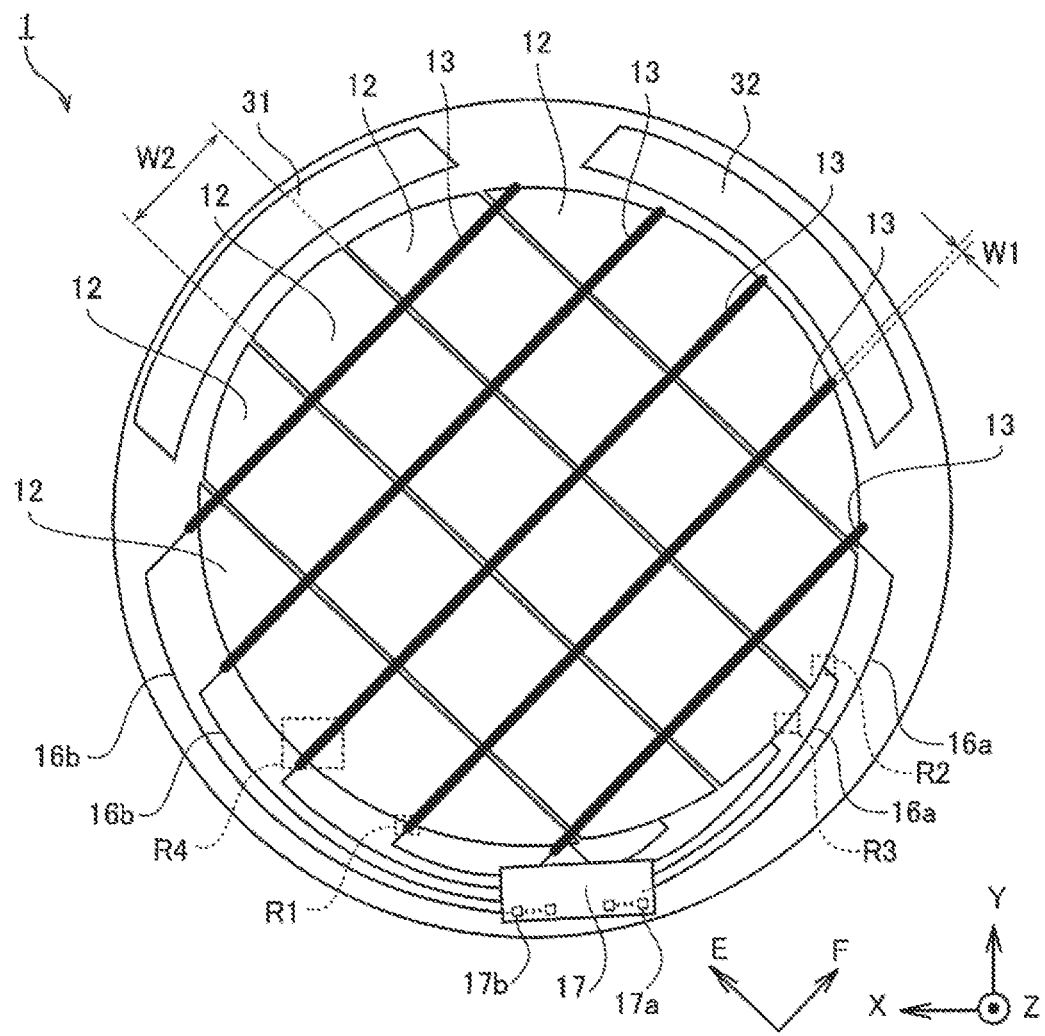
FIG. 10 is a plan view of the touch panel 1 according to the first embodiment.

FIG. 10 is a plan view of the touch panel 1 according to the first embodiment. As illustrated in FIG. 10, in the first embodiment, the touch panel 1 (color filter substrate 10) has a non-rectangular shape in a plan view, and has, for example, a circular shape.

Here, in the first embodiment, a plurality of the transmitter electrodes 12 extend in a direction along an E axis intersecting the X axis and intersecting the Y axis illustrated in FIG. 10. The plurality of transmitter electrodes 12 are disposed side by side in a direction along an F axis orthogonal to the F axis. An angle formed by the F axis and the X axis is, for example, 45 degrees. A plurality of the receiver electrodes 13 extend in a direction along the F axis. The plurality of receiver electrodes 13 are disposed side by side in a direction along the E axis. In other words, the plurality of receiver electrodes 13 extend in a direction intersecting the direction in which the transmitter electrodes 12 extend.

Furthermore, in the first embodiment, a width W1 of each receiver electrode 13 is smaller than a width W2 of each transmitter electrode 12. The width W1 of the receiver electrode 13 is small, and thus a coupling capacitance (load capacity) between the transmitter electrode 12 and the receiver electrode 13 can be reduced. As a result, a decrease of the signal from the receiver electrode 13 due to the coupling capacitance can be prevented.

As illustrated in FIG. 10, the touch panel 1 includes a plurality of transmitter wiring lines 16a each connected to a corresponding one of the plurality of transmitter electrodes 12, a plurality of receiver wiring lines 16b each connected to a corresponding one of the plurality of receiver electrodes 13, and a terminal portion 17. The transmitter wiring line 16a is connected to an end portion closer to a negative side of the F axis of the transmitter electrode 12. The receiver wiring line 16b is connected to an end portion closer to a net side of the Y axis of the receiver electrode 13. Furthermore, the terminal portion 17 is disposed on the active matrix substrate 20 closer to the negative side of the Y axis with respect to the plurality of transmitter electrodes 12 and the plurality of receiver electrodes 13. The terminal portion 17 includes a plurality of transmitter terminals 17a each connected to a corresponding one of the plurality of transmitter wiring lines 16a, and a plurality of receiver terminals 17b each connected to a corresponding one of the plurality of receiver win lines 16b. The plurality of transmitter wiring lines 16a and the plurality of receiver wiring lines 16b are formed on the active matrix substrate 20 in a portion closer to a negative side of the Y axis of the touch panel 1. The terminal portion 17 is connected to a flexible printed circuit board (not illustrated), and electrically connects the controller 2 to the plurality of transmitter electrodes 12 and the plurality of receiver electrodes 13. The transmitter wiring line 16a, the receiver wiring line 16b, and a signal line 16c described below contain a metal material (for example, aluminum, titanium, copper, or the like).

As illustrated in FIG. 10, a GPS antenna 31 and a communication circuit 32 are disposed in a portion closer to a positive side of the Y axis of the touch panel 1. The controller 2 acquires position information via the GPS antenna 31. The controller 2 wirelessly communicates with another device via the communication circuit 32.

Figure 11A:
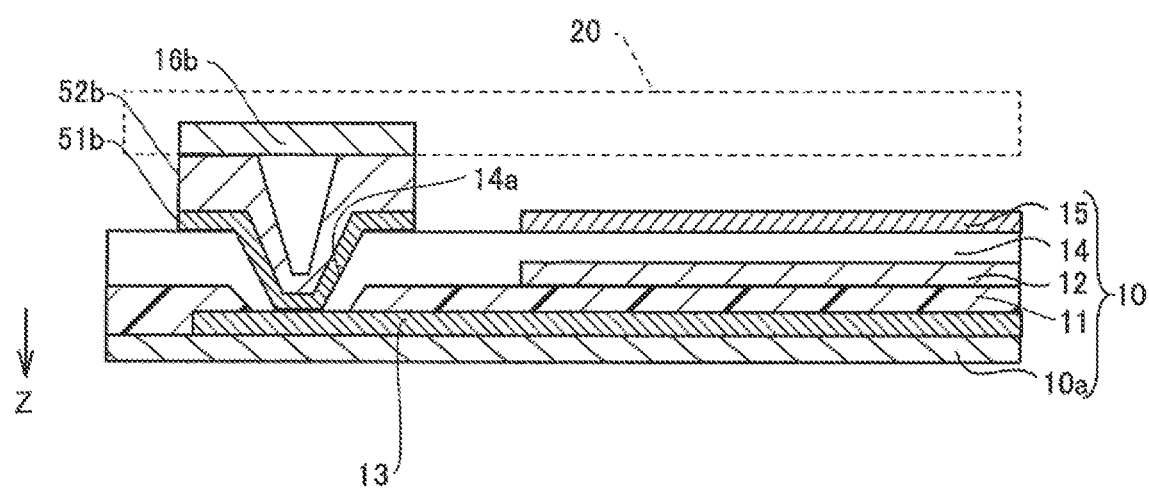
FIG. 11A is a cross-sectional view of a portion of the touch panel 1 for describing a connection between the receiver electrode 13 and a receiver wiring line 16b, and is a cross-view in a region R1 in FIG. 10.
Figure 11B:
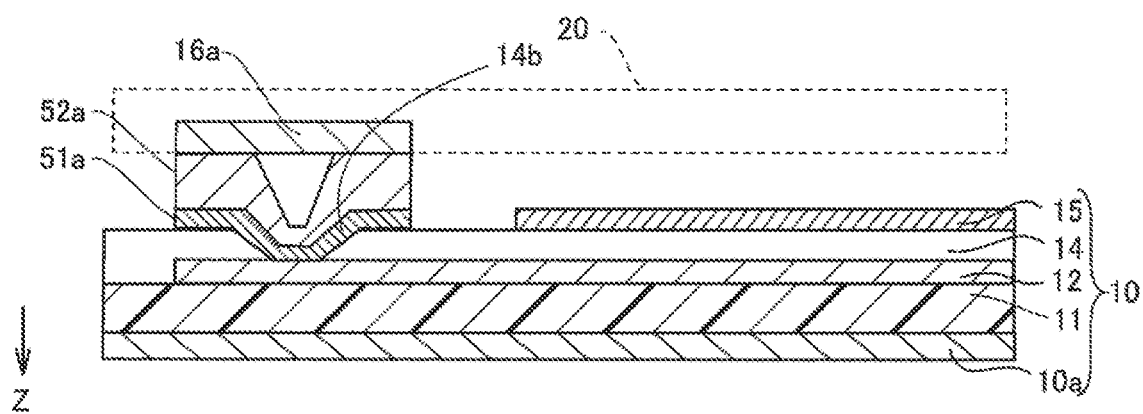
FIG. 11B is a cross-sectional view of a portion of the touch panel 1 describing a connection between the transmitter electrode 12 and a transmitter wiring line 16a, and is a cross-sectional view in a region R2 in FIG. 10.
Figure 11C:
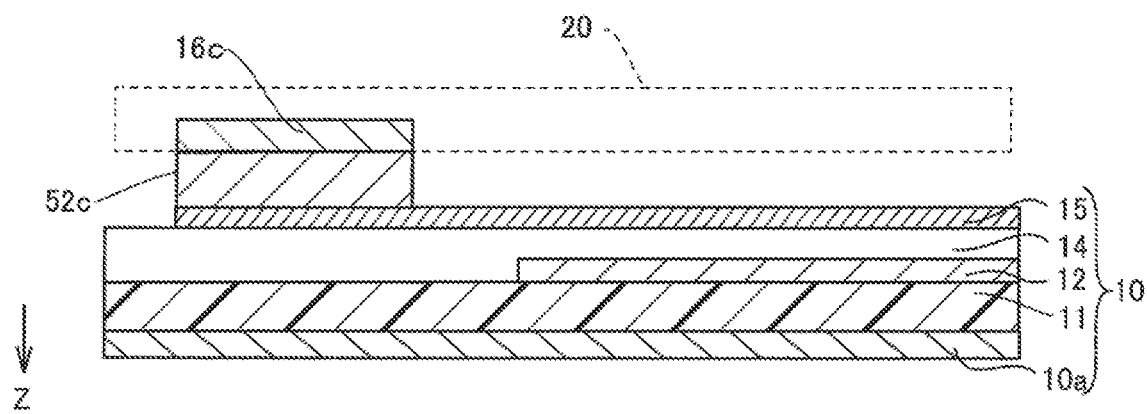
FIG. 11C is a cross-sectional view of portion of the touch panel for describing a connection between the common electrode 15 and a signal line 16c, and is a cross-sectional view in a region R3 in FIG. 10.

FIG. 11A is a cross-sectional view of a portion of the touch panel 1 for describing a connection between the receiver electrode 13 and the receiver wiring line 16b, and is a cross-sectional view in a region R1 in FIG. 10. FIG. 11B is a cross-sectional view of a portion of the touch panel 1 for describing a connection between the transmitter electrode 12 and the transmitter wiring line 16a, and is a cross-sectional view in a region R2 in FIG. 10. FIG. 11C is a cross-sectional view of a portion of the touch panel 1 for describing a connection between the common electrode 15 and the signal line 16c, and is a cross-sectional view in a region R3 in FIG. 10. As illustrated in FIG. 11A, a contact hole 14a is provided in the overcoat film 14. A conductor 51b and a common transfer material 52b containing a conductive material connected to the receiver wiring line 16b are disposed in the contact hole 14a. The conductor 51b is connected to the receiver electrode 13. As a result, the receiver electrode 13 of the color filter substrate 10 and the receiver wiring line 16b of the active matrix substrate 20 are connected to each other. Furthermore, as illustrated in FIG. 11B, a contact hole 14b is provided in the overcoat film 14. A conductor 51a and a common transfer material 52a containing a conductive material connected to the transmitter wiring line 16a are disposed in the contact hole 14b. The conductor 51a is connected to the transmitter electrode 12. As a result, the transmitter electrode 12 of the color filter substrate 10 and the transmitter wiring line 16a of the active matrix substrate 20 are connected to each other. As illustrated in FIG. 1C, a common transfer material 52c containing a conductive material is disposed on the common electrode 15. As a result, the common electrode 15 of the color filter substrate 10 is connected to the signal line 16c of the active matrix substrate 20 via the common transfer material 52c. The common transfer materials 52a to 52c are formed of, for example, a material in which a resin material having adhesiveness and a conductive material are mixed.

According to the above configuration wiring line resistance can be reduced by using: the transmitter wiring line 16a of a metal, the receiver wiring line 16b of a metal, and the signal line 16c of a metal, each having a smaller resistance value than the transparent electrode. As a result, influences of the wiring line resistance on the signal to the transmitter electrode 12 and the signal from the receiver electrode 13 can be reduced. Furthermore, as in the first embodiment, even when the touch sensor control circuit 53 is provided on the active matrix substrate 20, the transmitter electrode 12 or the receiver electrode 13 can be easily connected to the touch sensor control circuit 53, by using the conductors 51a and 51b in the contact holes 14a and 14b, and the transmitter wiring line 16a and the receiver wiring line 16b.

Configuration of Gap Portion

Figure 12A:
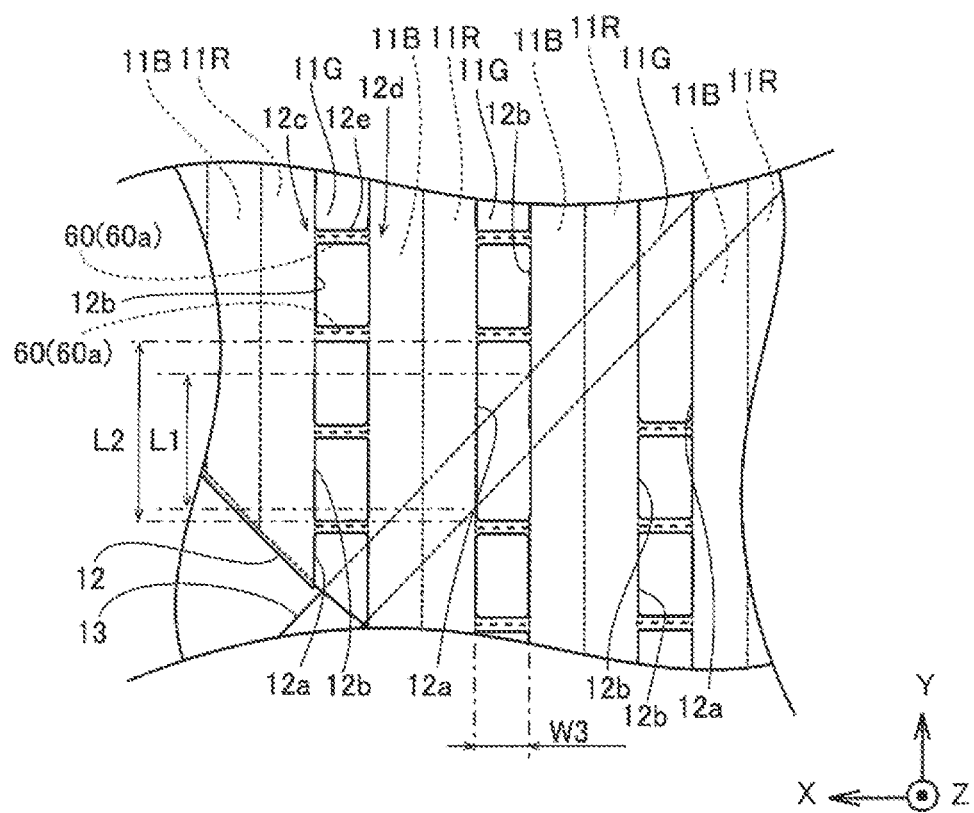
FIG. 12A is a plan view of a portion of the color filter substrate 10 and is a partly enlarged view a region R4 in FIG. 10.

FIG. 12A is a plan view of a portion of the color filter substrate 10 and is a partially enlarged view of a region R4 in FIG. 10. As illustrated in FIG. 12A, the blue color filter 11B, the green color filter 11G, and the red color filter 11R are disposed side by side in the X direction. In the first embodiment, as illustrated in FIGS. 3 and 12A, the transmitter electrode 12 includes gap portions 12a and gap portions 12b at positions in which the receiver electrode 13 is disposed. As illustrated in FIG. 12A, each of the gap portions 12a and the gap portions 12b is formed as an opening (hole) in a plan view in the first embodiment. Each of the gap portions 12a is formed at a position of the transmitter electrode 12 intersecting the receiver electrode 13 and in a portion overlapping the green color filter 11G in a plan view. Note that, in the first embodiment, the "gap portions 12a and 12b" refers to portions where the transmitter electrode 12 is not provided, and other members (for example, portions of the overcoat film 14) may be disposed in the gap portion 12a and in the gap portion 12b.

As, illustrated in FIG. 12A, the gap portion 12a is formed, for example, in a rectangular shape in a plan view. A width W3 along the X axis of the gap portion 12a is equal to a width of the green color filter 11G. A length 12 along the Y axis of the gap portion 12a is longer than a length L1 along the Y axis in a portion where the receiver electrode 13 and the green color filter 11G overlap each other in a plan view. As a result, the transmitter electrode 12 is not disposed in the portion where the green color filter 11G and the receiver electrode 13 overlap each other in a plan view.

Furthermore, the gap portion 12b is formed for each pixel 60 along the Y axis in a portion overlapping the green color filter 11G in a plan view. The gap portion. 12b is formed in a portion of the transmitter electrode 12 not overlapping the receiver electrode 13 in a plan view. A connection portion 12e is formed between the gap portion 12a and the gap portion 12b adjacent to each other in the Y direction and between two gap portions 12b adjacent to each other in the Y direction. The connection portion 12e is a portion for connecting a portion. 12c of the transmitter electrode 12 closer to one side of the X axis with respect to the green color filter 11G and a portion 12d closer to the other side. The connection portion 12e is formed at, for example, a position overlapping a boundary portion 60a of adjacent ones of the pixels 60 in the Y direction.

Here, among green, red, and blue, green has the highest luminosity factor for humans. In contrast, according to the above-described configuration, the transmitter electrode 12 is not provided at a position overlapping the green color filter for transmitting green light whose brightness and darkness are easily perceived by the humans. As a result, it is possible to reduce loss of green light whose brightness and darkness are easily perceived by the humans, and this can cause the user to feel the display bright even when the in-cell touch panel device 100 is provided with the mutual capacitance type touch panel 1. In a reflection type display including the reflector 40d, light needs to transmit through the transmitter electrode and the receiver electrode twice when being incident and reflected, and thus a loss of light (absorption or scatter) increases as compared with the transmission type. Thus, according to the configuration described above, even when the reflector 40d is provided, the loss of green light can be reduced, and this can cause the user to feel the display bright.

First Modified Example of First Embodiment

Figure 12B:
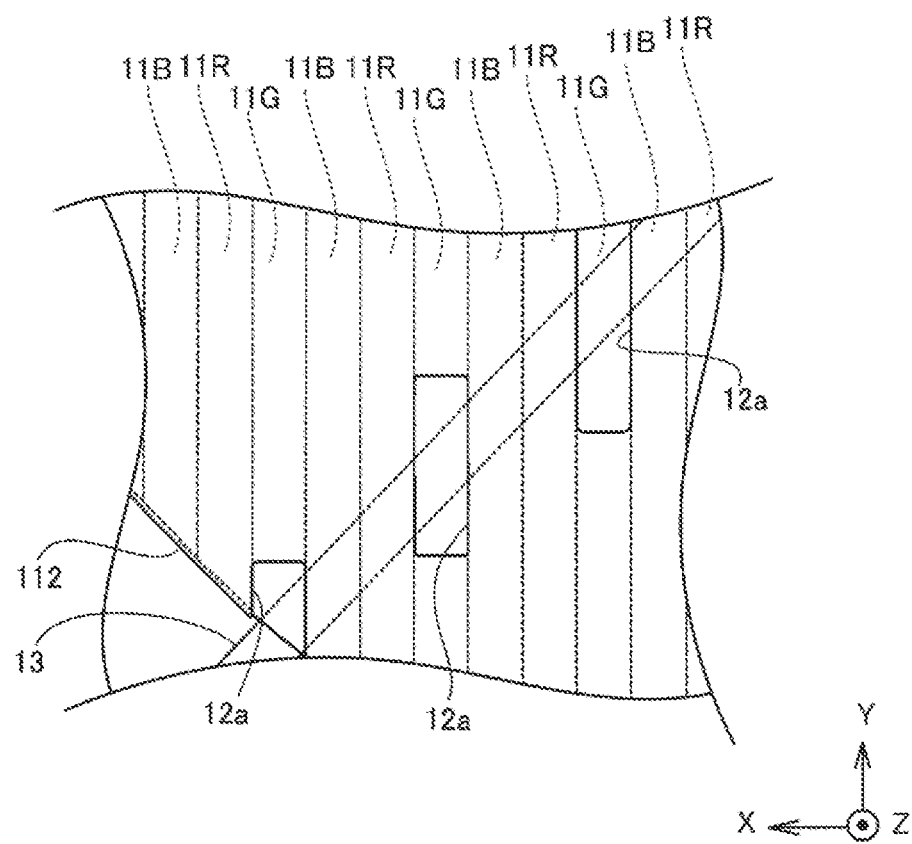
FIG. 12E is a plan view of a portion of a transmitter electrode 112 according to a first modified example according to the first embodiment.

Next, a configuration of a transmitter electrode 112 according to a first modified example of the first embodiment will be described with reference to FIG. 12B. FIG. 12B is a plan view for describing the configuration of the transmitter electrode 112 according to the first modified example of the first embodiment. As illustrated in FIG. 12E, in the transmitter electrode 112 according to the first modified example of the first embodiment, the gap portion 12a is provided while the gap portion 12b (see FIG. 12A) is not provided. Even with this configuration, there is an effect of reducing the loss of green light, and this can cause the user to feel the display bright.

Second Modified Example of First Embodiment

Figure 13:
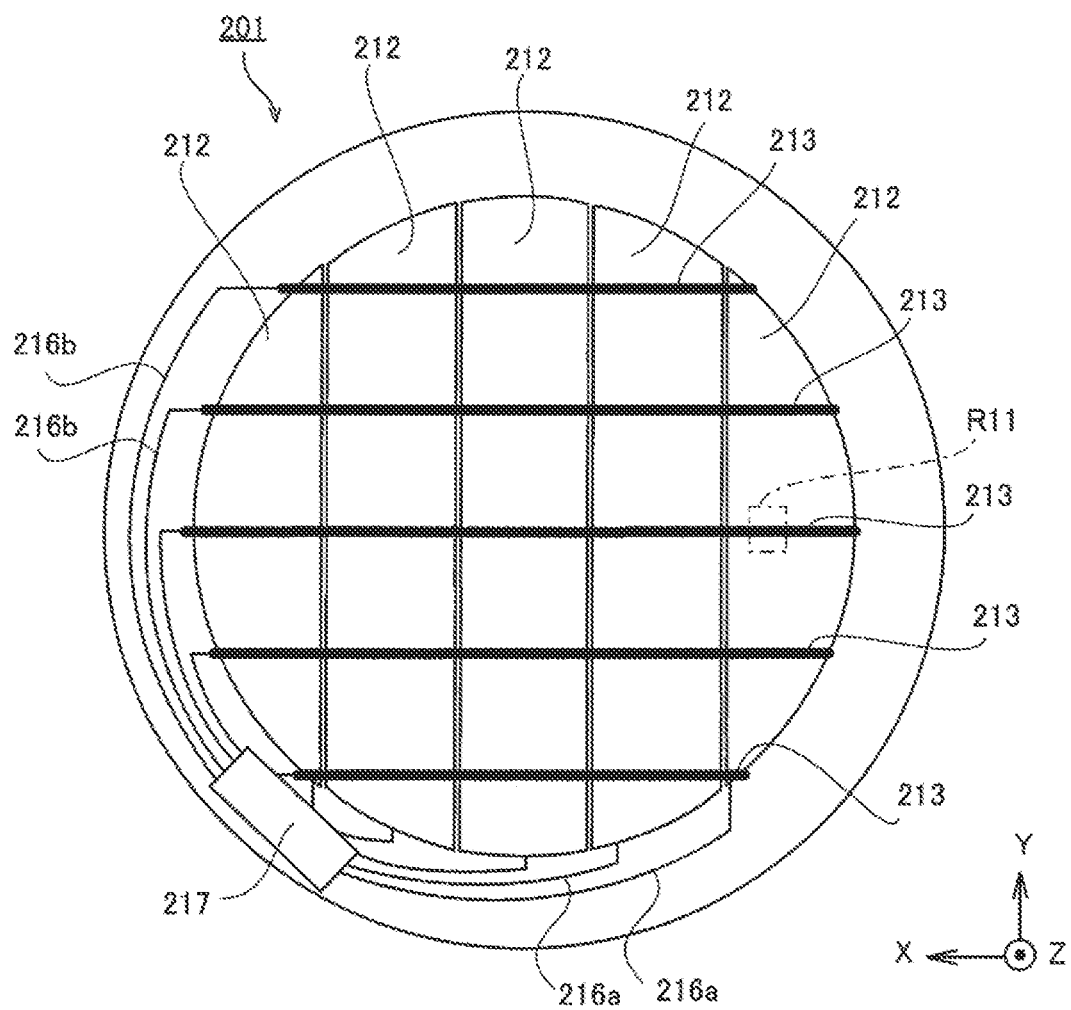
FIG. 13 is a plan view of a toucan panel 201.
Figure 14:
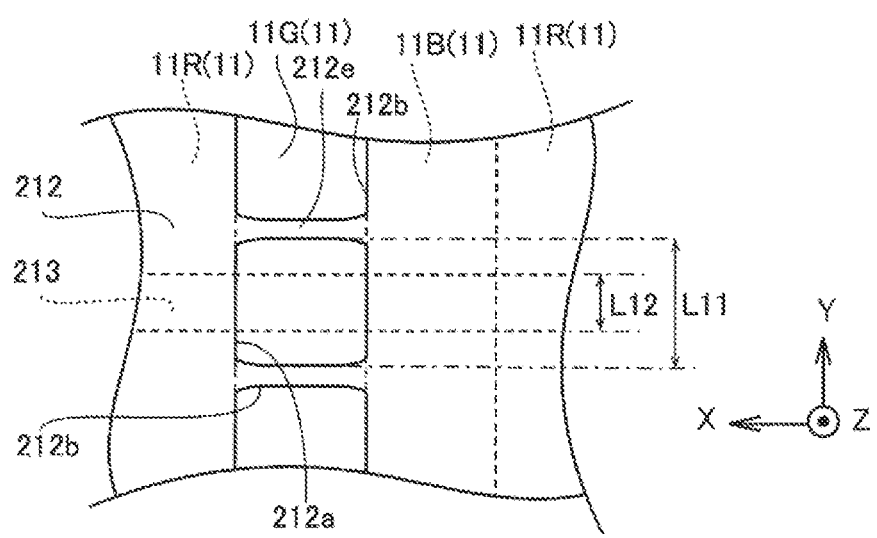
FIG. 14 is a view for describing a configuration of a gap portion 212a, and is a partially enlarge view of a region R12 in FIG. 13.

Next, a configuration of a touch panel 201 according to a second modified example of the first embodiment will be described with reference to FIGS. 13 and 14. FIG. 13 is a plan view of the touch panel 201. FIG. 14 is a view for describing a configuration of gap portions 212a and 212b, and is a partially enlarged view of a region R11 in FIG. 13.

As illustrated in FIG. 13, the touch panel 201 includes a plurality of transmitter electrodes 212 extending in a direction along the Y axis, and a plurality of receiver electrodes 213 extending in a direction along the X axis. The plurality of transmitter electrodes 212 are disposed side by side in a direction along the X axis. The plurality of receiver electrodes 213 are disposed side by side in a direction along the Y axis. The touch panel 201 includes a terminal portion 217, a plurality of transmitter wiring lines 216a, and a plurality of receiver wiring lines 216b. The transmitter wiring line 216a is connected to an end portion closer to the negative side of the Y axis of the transmitter electrode 212 and is connected to the terminal portion 217. The receiver wiring line 216b is connected to an end portion closer to the positive side of the X axis of the receiver electrode 213 and is connected to the terminal portion 217.

As illustrated in FIG. 14, the blue color filter 11B, the green color filter 11G, and the red color filter 11R are disposed side by side in the X direction. In the second modified example of the first embodiment, the transmitter electrode 212 includes a gap portion 212a in each portion overlapping the green color filter 11G and the receiver electrode 13 in a plan view. Furthermore, the transmitter electrode 212 includes a gap portion 212b in a portion overlapping the green color filter 11G in a plan view in a portion not overlapping the receiver electrode 13 in a plan view. A length L11 along the Y axis of the gap portion 212a is longer than a length L12 along the Y axis of the receiver electrode 213.

Also in the second modified example of the first embodiment described above, the loss of green light can be reduced by the gap portions 212a and 212b, and this can cause the user to feel display by the touch panel 201 bright. Note that other configurations and effects are similar to those in the first embodiment.

Third Modified Example of First Embodiment

Figure 15:
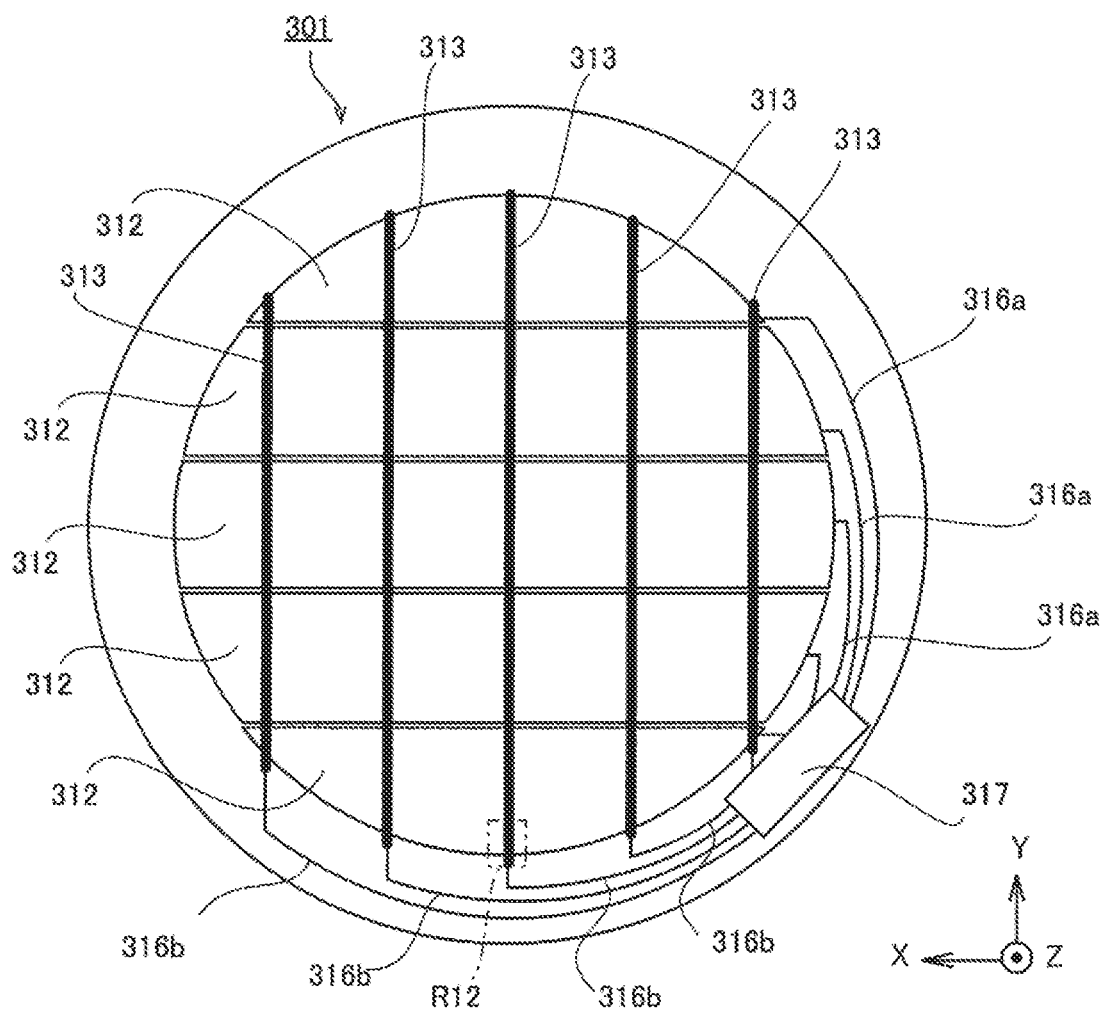
FIG. 15 is a plan view of a touch panel 301.
Figure 16:
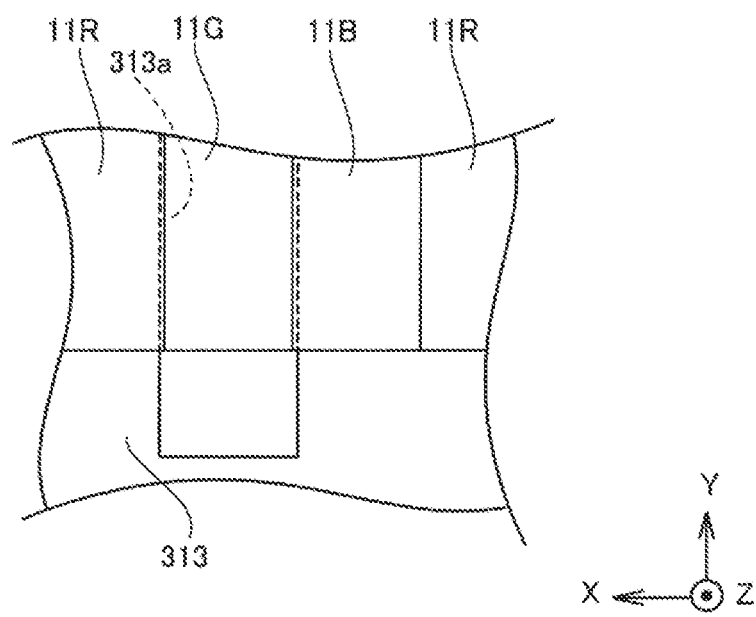
FIG. 16 is a view for describing a configuration of a gap portion 313a, and is a partially enlarged view of a region R12 in FIG. 15.
Figure 17:
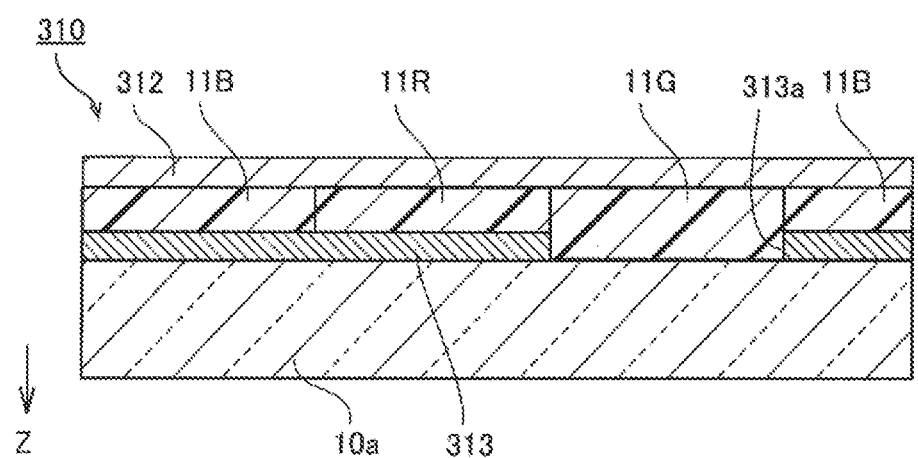
FIG. 17 is a cross-sectional view of a portion of a color filter substrate 310.

Next, a configuration of a touch panel 301 according to a third modified example of the first embodiment will be described with reference to FIGS. 15 to 17. FIG. 15 is a plan view of a touch panel 301. FIG. 16 is a view for describing a configuration of a gap portion 313a, and is a partially enlarged view of a region R12 in FIG. 15. The touch panel 301 includes a color filter substrate 310. FIG. 17 is a cross-sectional view of a portion of the color filter substrate 310.

As illustrated in FIG. 15, the touch panel 301 includes a plurality of transmitter electrodes 312 extending in a direction along the X axis, and a plurality of receiver electrodes 313 extending in a direction along the Y axis. The plurality of transmitter electrodes 312 are disposed side by side in a direction along the Y axis. The plurality of receiver electrodes 313 are disposed side by side in a direction along the X axis. The touch panel 301 includes a terminal portion 317, a plurality of transmitter wiring lines 316a, and a plurality of receiver wiring lines 316b. The transmitter wiring line 316a is connected to an end portion closer to the negative side of the X axis of the transmitter electrode 312 and is connected to the terminal portion 317. The receiver wiring line 316b is connected to an end portion closer to the negative side of the Y axis of the receiver electrode 313 and is connected to the terminal portion 317.

As illustrated in FIG. 16, the blue color filter 11B, the green color filter 11G, and the red color filter 11R are disposed side by side in the X direction. In the third modified example of the first embodiment, the receiver electrode 313 includes a gap portion 313a in a portion overlapping, the green color filter 11G and the transmitter electrode 312 in a plan view. Furthermore, a portion separated by the gap portion 313a is connected closer to the negative side of the Y axis with respect to the color filter 11 of the receiver electrode 313. In other words, the gap portion 313a is provided in the receiver electrode 313, and thus the receiver electrode 313 is formed in a comb shape in a plan view.

As illustrated in FIG. 17, the green color filter 11G is disposed in the gap portion 313a. As a result, also in the third modified example of the first embodiment, the loss of green light can be reduced by the gap portion 313a, and this cause the user to feel display by the touch panel 201 bright. Note that other configurations and effects are similar to those in the first embodiment.

Second Embodiment

Figure 18:
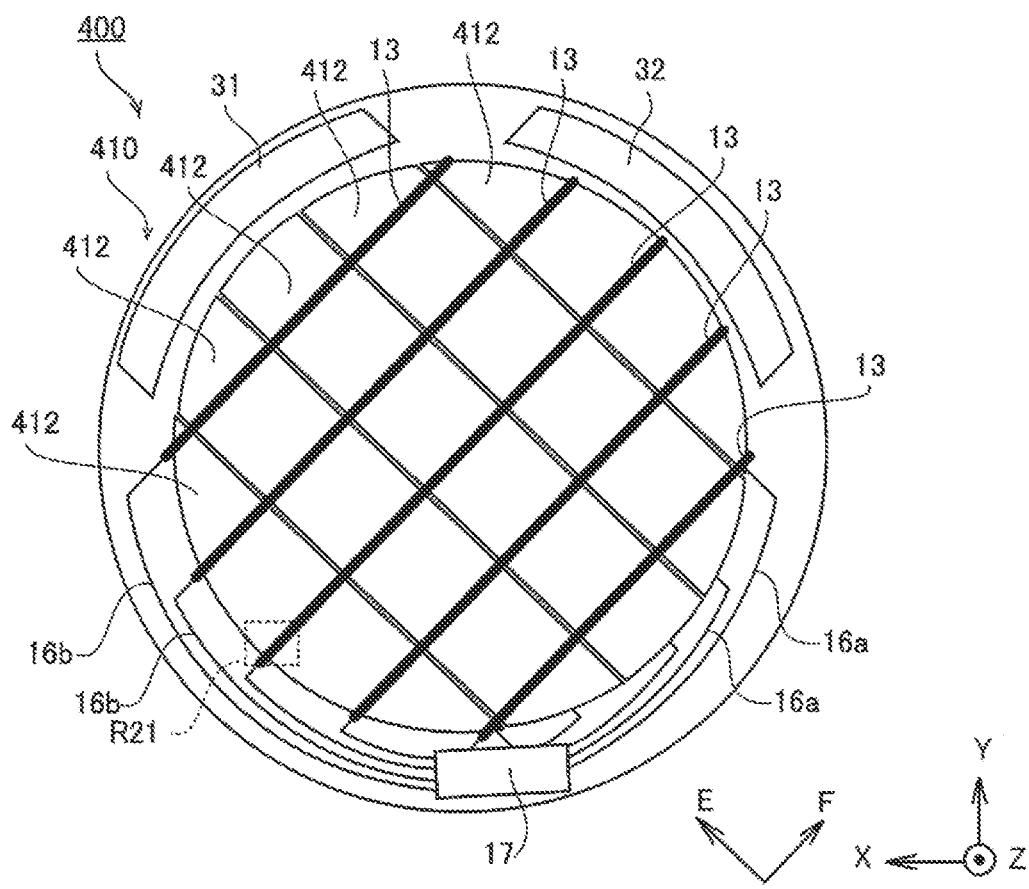
FIG. 18 is a plan view of an in-cell touch panel device 400 according to a second embodiment.
Figure 19:
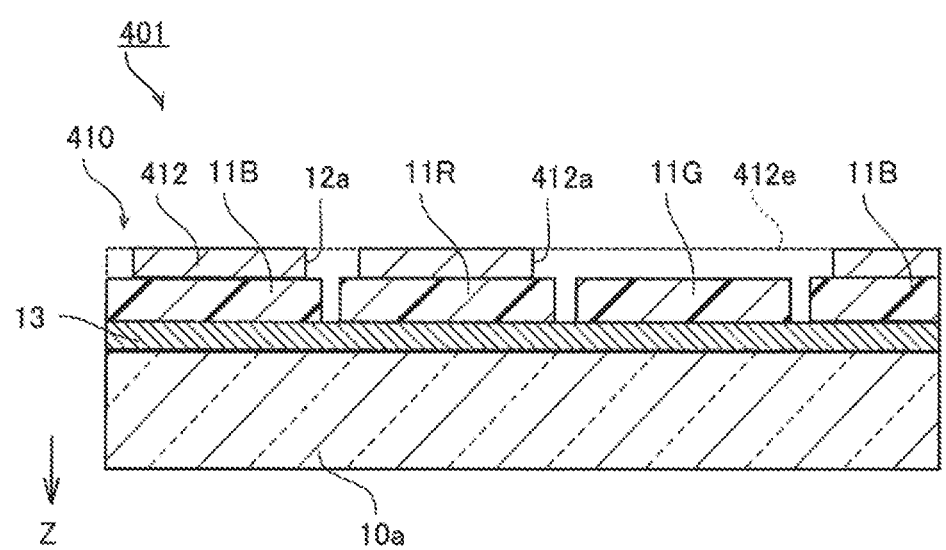
FIG. 19 is a cross-sectional view of a portion where the receiver electrode 13 of a color filter substrate 410 according to the second embodiment is disposed.
Figure 20:
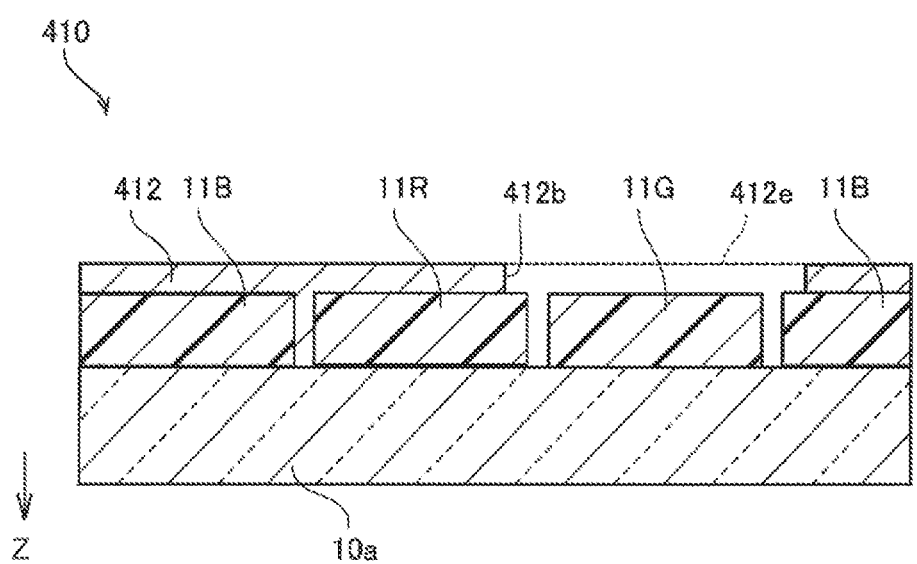
FIG. 20 is a cross-sectional view of a portion where the receiver electrode 13 of the color further substrate 410 according to the second embodiment is not disposed.
Figure 21:
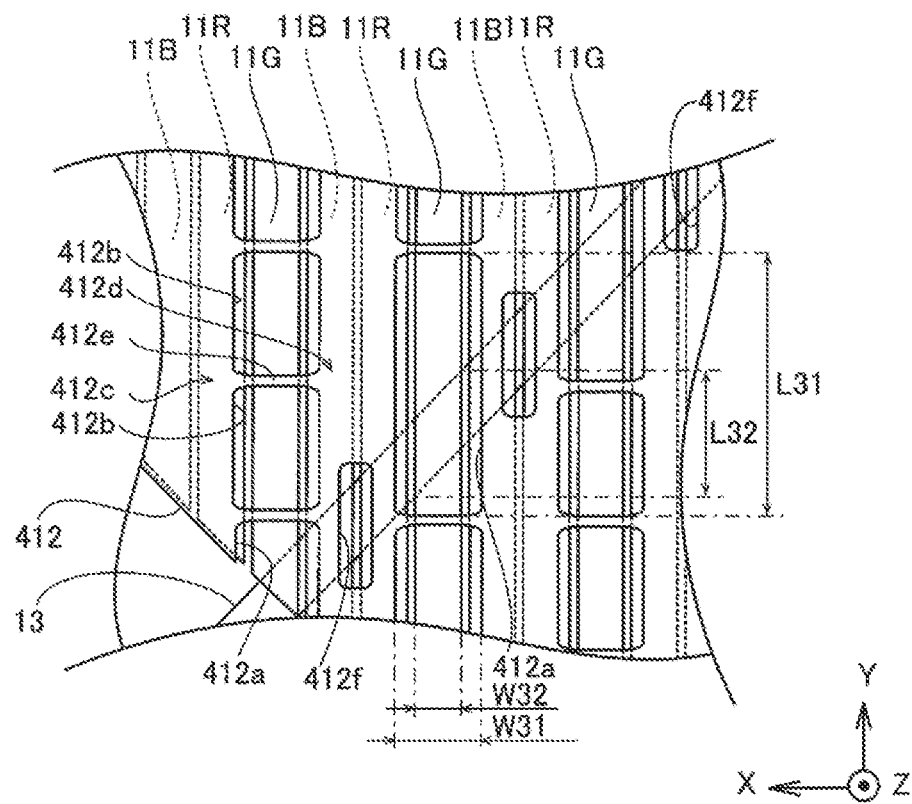
FIG. 21 is a view for describing a gap portion 412b according to the second embodiment.

Next, a configuration of an in-cell touch panel device 400 of a second embodiment will be described with reference to FIGS. 18 to 21. In the second embodiment, a gap portion. 412a is formed in a portion overlapping a space between ones of the plurality of color filters 11 in a plan view. FIG. 18 is a plan view of an in-cell touch panel device 400 according to the second embodiment. FIG. 19 is a cross-sectional view of a portion where the receiver electrode 13 of a color filter substrate 410 according to the second embodiment is disposed. FIG. 20 is a cross-sectional view of a portion where the receiver electrode 13 of the color filter substrate 410 according to the second embodiment is not disposed. FIG. 21 is a view for describing gap portion 412b according to the second embodiment. Note that, in the following description, when the same reference numerals as those in the first embodiment are used, similar configurations to those in the first embodiment are indicated, and reference is made to the preceding description unless otherwise described.

As illustrated in FIGS. 18 and 19, the in-cell touch panel device 400 according to the second embodiment includes a touch panel 401 including the color filter substrate 410. As illustrated in FIG. 18, the color filter substrate 410 includes transmitter electrodes 412 and receiver electrodes 13. The transmitter electrode 412 is formed to extend along the E axis. A plurality of the transmitter electrodes 412 are disposed side by side along the F axis.

As illustrated in FIG. 19, the transmitter electrode 412 includes a gap portion 412a. At a position on the color filter substrate 410 where the receiver electrode 13 is disposed, the gap portion 412a continuously formed from a portion overlapping a space between the green color filter 11G and the blue color filter 11B in an view to a portion overlapping the green color filter 11G in a plan view and a portion overlapping a space between the green color filter 11G and the red color filter 11R in a plan view. As a result, at the position on the color filter substrate 410 where the receiver electrode 13 is disposed, the transmitter electrode 412 is not formed on the green color filter 11G.

As illustrated in FIGS. 20 and 21, the transmitter electrode 412 includes a gap portion. 412b. At a position on the color filter substrate 410 where the receiver electrode 13 is not disposed, the gap portion. 412b is continuously formed from a portion overlapping a space between the green color filter 11G and the blue color filter 11B in a plan view to a portion overlapping the green color filter 11G in a plan view and a portion overlapping a space between the green color filter 11G and the red color filter 11R in a plan view. As a result, even at the position on the color filter substrate 410 where the receiver electrode 13 is not disposed, the transmitter electrode 412 is not formed in a portion of the green color filter 11G.

As illustrated in FIG. 21, the transmitter electrode 412 includes a connection portion 412e for connecting a portion 412c on the red color filter 11R and a portion 412d on the blue color filter 11B. The connection portion 412e is formed at a position on the color filter substrate 410 where the receiver electrode 13 is not disposed. Furthermore, the gap portion 412b is formed for each pixel 60 (see FIG. 7) along the Y axis on the green color filter 11G. The connection portion 412e is also formed between the two gap portions 412b adjacent to each other in the Y direction. The connection portion 412e is formed at, for example, a position overlapping a boundary portion of the pixels 60 adjacent to each other in the Y direction.

Furthermore, as illustrated in FIG. 21, a width W31 in a direction along the X axis of the gap portion 412a is longer than a width W32 of the green color filter 11G. A length L31 in a direction along the Y axis of the gap portion 412a is longer than a length L32 along the F direction in a portion where the green color filter 11G and the receiver electrode 13 overlap each other. Furthermore, in the transmitter electrode 412, a gap portion 412f is provided in a portion overlapping a space between the red color filter 11R and the blue color filter 11B in a portion overlapping the receiver electrode 13.

Here, in a case where a gap is provided between adjacent ones of the plurality of color filters 11, the transmitter electrode and the receiver electrode may be short-circuited via the gap, but according to the configuration of the second embodiment, the transmitter electrode 412 and the receiver electrode 13 are not in contact with each other due to the gap portions 412a and 412f, and thus the transmitter electrode 412 and the receiver electrode 13 can be prevented from being short-circuited. By continuously forming the gap portion 412a in the portion overlapping the space between the color filters 11 adjacent to each other in a plan view and the portion overlapping the green color filter 11G in a plan view, the configuration of the transmitter electrode 412 can be simplified as compared with a case where each gap portion is separately formed in the portion overlapping the space between the color filters 11 adjacent to each other in a plan view and the portion overlapping the green color filter 11G in a plan view. Note that other configurations and effects of the second embodiment are similar to the configurations and effects of the first embodiment.

First Modified Example of Second Embodiment

Figure 22:
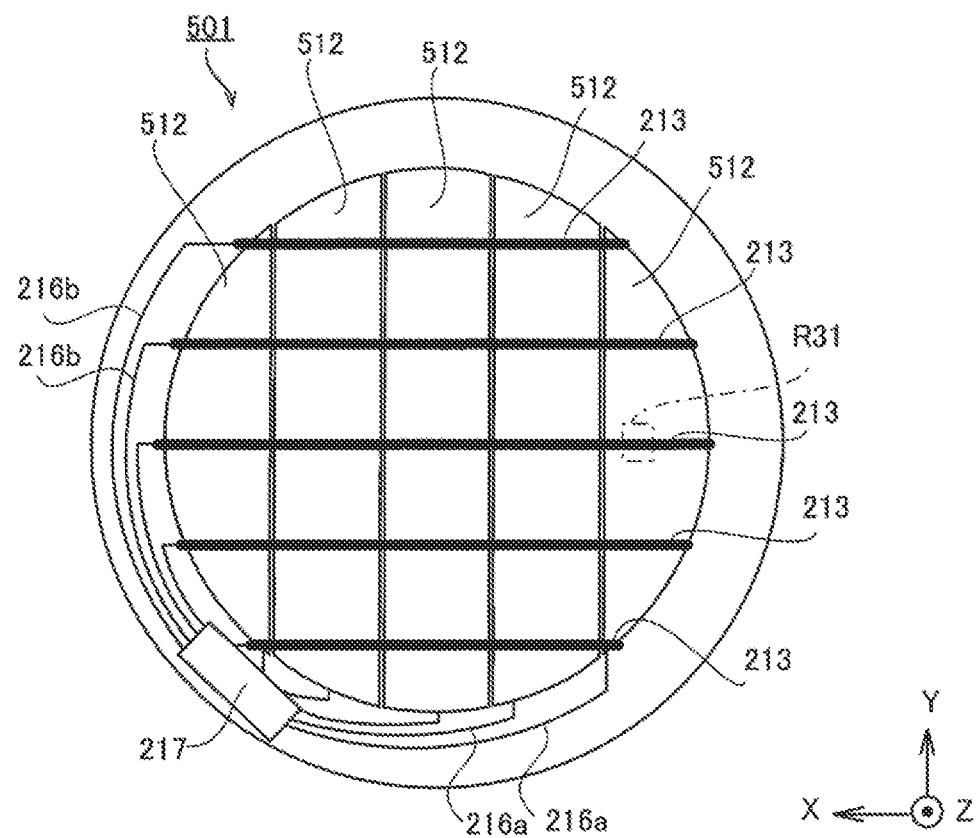
FIG. 22 is a plan view of a touch panel 501 according to a first modified example of the second embodiment.
Figure 23:
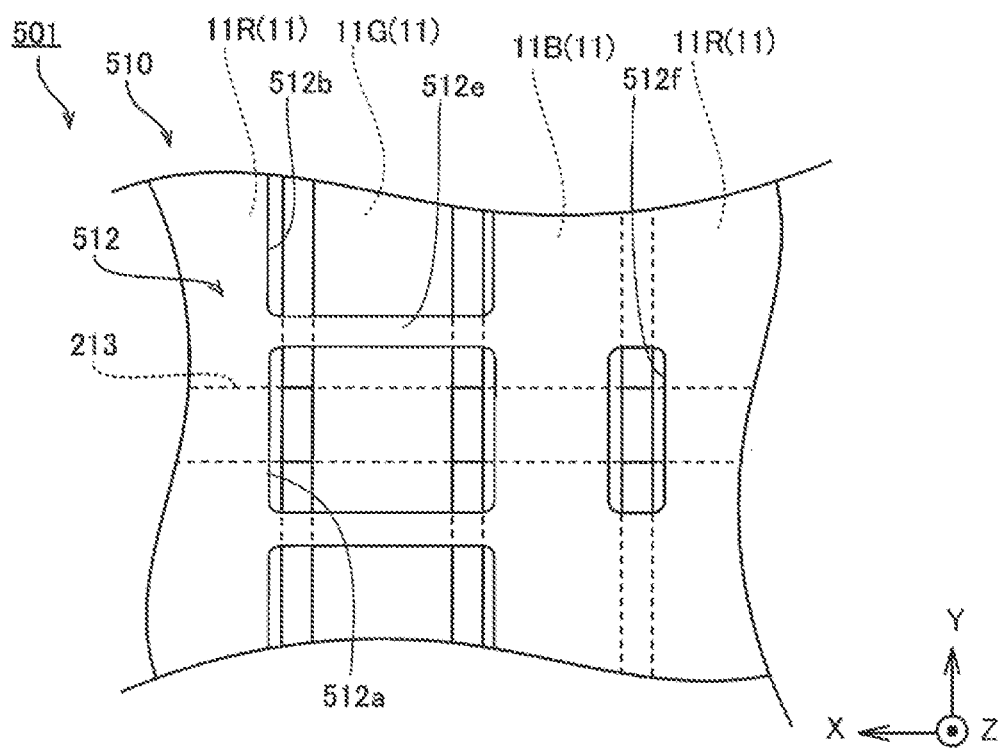
FIG. 23 is a plan view of a portion of the touch panel 501, and is a partially enlarged view of a region R31 in FIG. 22.

Next, a configuration of a touch panel 501 according to a first modified example of the second embodiment will be described with reference to FIGS. 22 and 23. FIG. 22 is a plan view of the touch panel 501 according to the first modified example of the second embodiment. FIG. 23 is a plan view or a portion of the touch panel 501, and is a partially enlarged view of a region R31 in FIG. 22. The touch panel 501 includes a color filter substrate 510. Note that, in the following description, when the same reference numerals as those in the second modified example of the first embodiment are used, similar configurations to those in the second modified example of the first embodiment are indicated, and reference is made to the preceding description unless otherwise described.

As illustrated in FIG. 22, the touch panel 501 includes a plurality of transmitter electrodes 512 extending in a direction along the Y axis. The plurality of transmitter electrodes 512 are disposed side by side in a direction along the X axis.

As illustrated in FIG. 23, in the first modified example of the second embodiment, the transmitter electrode 512 includes gap portions 512a and 512b. At a position on the color filter substrate 510 where the receiver electrode 213 is disposed, the gap portion 512a is formed from a portion overlapping a space between the green color filter 115 and the blue color filter 11B in a plan view to a portion overlapping the green color filter 11G in a plan view and a portion overlapping a space between the green color filter 11G and the red color filter 11R in a plan view. At a position on the color filter substrate 510 where the receiver electrode 213 is not disposed, the gap portion 512b formed from a portion overlapping a space between the green color filter 11G and the blue color filter 11B in a an view to a portion overlapping the green color filter 11G in a plan view and a portion overlapping a space between the green color filter 11G and the red color filter 11R in a plan view. Furthermore, the transmitter electrode 512 includes a connection portion 512e for connecting a portion closer to the positive side of the x axis with respect to the green color filter 11G to a portion closer to the negative side of the X axis with respect to the green color filter 11G. Furthermore, the gap portion 512b is formed for each pixel 60 (see FIG. 7) along the Y axis on the green color filter 11G. The connection portion 512e is also formed between the two gap portions 512b adjacent to each other in the direction. The connection portion 512e is formed at, for example, a position overlapping a boundary portion of the pixels 60 adjacent to each other in the Y direction. Furthermore, in the transmitter electrode a gap portion 512f is provided in a portion overlapping a space between the red color filter 11R and the blue color filter 11B in a portion overlapping the receiver electrode 213. According to the configuration of the first modified example of the second embodiment, the transmitter electrode 512 and the receiver electrode 213 are not in contact with each other due to the gap portions 512a and 512f, and thus the transmitter electrode 512 and the receiver electrode 213 can be prevented from being short-circuited.

Note that other configurations and effects are similar) those in the second modified example of the first embodiment.

Second Modified Example of Second Embodiment

Figure 24:
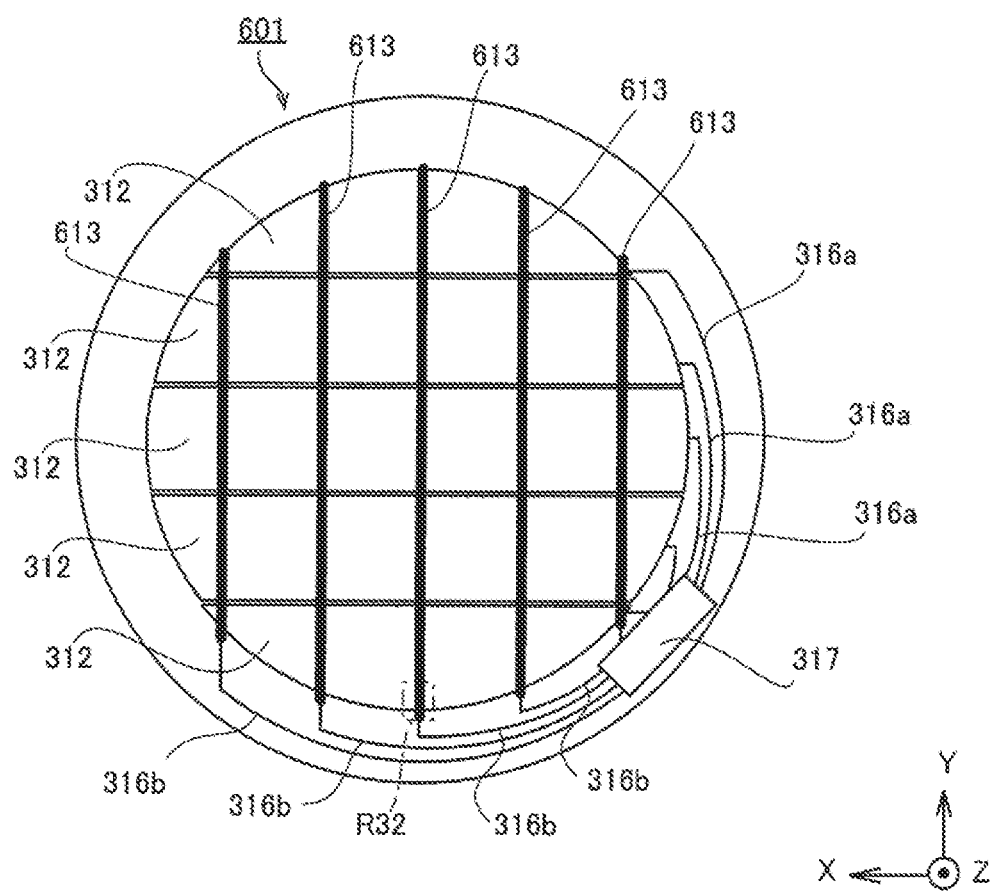
FIG. 24 is a plan view of a touch panel 601.
Figure 25:
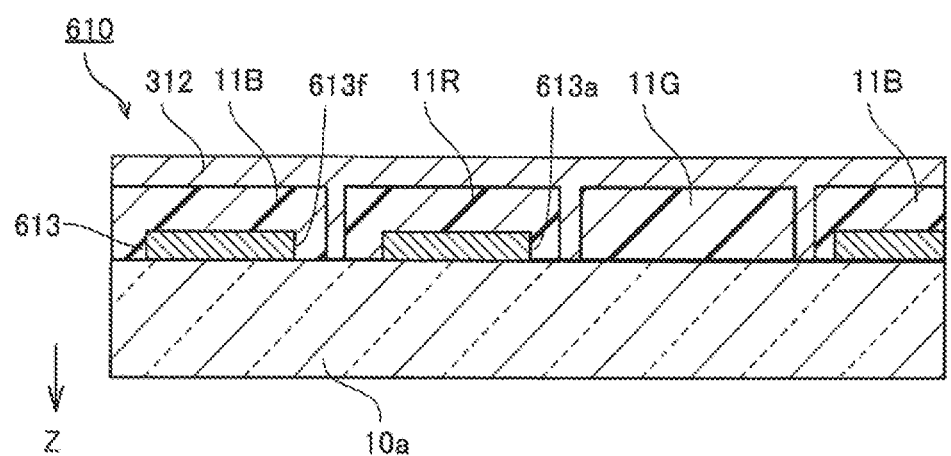
FIG. 25 is a view for describing a configuration of a gap portion 613a, and is a partially enlarged view of a region R32 in FIG. 24.
Figure 26:
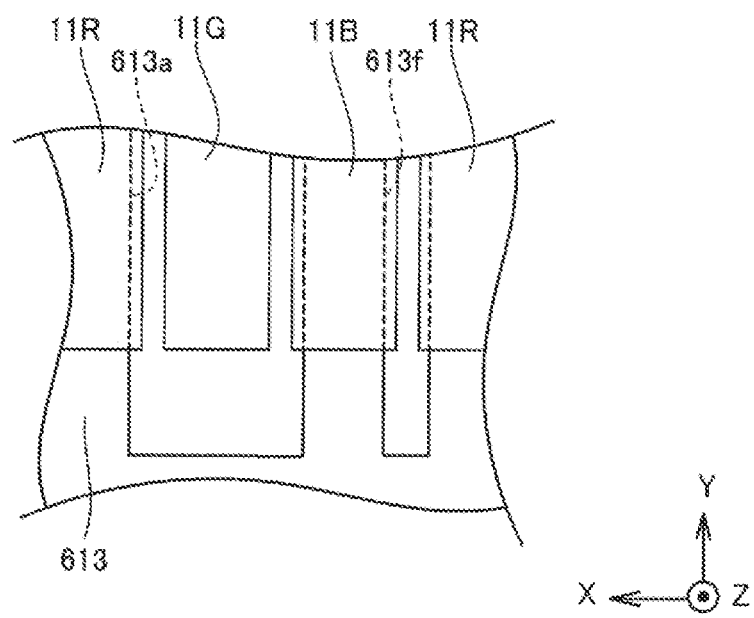
FIG. 26 is a cross-sectional view of a portion of the color filter substrate 310.

Next, configuration of a touch panel 601 a second modified example of the second embodiment will be described with reference to FIGS. 24 to 26. FIG. 24 is a plan view of the touch panel 601. FIG. 25 is a view for describing a configuration of a gap portion 613a, and is a partially enlarged view of a region R32 FIG. 24. The touch panel 601 includes a color filter substrate 610. FIG. 26 is a cross-sectional view of a portion of the color filter substrate 310.

As illustrated in FIG. 24, the touch panel 601 includes a plurality of receiver electrodes 613 extending in a direction along the Y axis. The plurality of receiver electrodes 613 are disposed side by side in a direction along the X axis.

As illustrated in FIG. 25, in the second modified example of the second embodiment, the receiver electrodes 613 includes gap portions 613a and 613f. The gap portion 613a is formed from a portion overlapping a space between the green color filter 11G and the blue color filter 11B in a plan view to a portion overlapping the green color filter 11G in a plan view and a portion overlapping a space between the green color filter 11G and the red color filter 11R in a plan view. The gap portion 613f is formed in a portion overlapping a space between the red color filter 11R and the blue color filter 11B in a plan view.

As illustrated in FIG. 26, portions closer to the positive side and the negative side of the X axis with respect to the green color filter 11G of the receiver electrode 613 are connected to each other closer to the negative side of the Y axis with resect to the green color filter 11G. According to the configuration of the second modified example of the second embodiment, the transmitter electrode 312 and the receiver electrode 613 are not in contact with each other due to the gap portions 612a and 613f, and thus the transmitter electrode 312 and the receiver electrode 613 can be prevented from being, short-circuited. Note that other configurations and effects are similar to those in the third modified example of the first embodiment.

Third Embodiment

Figure 27:
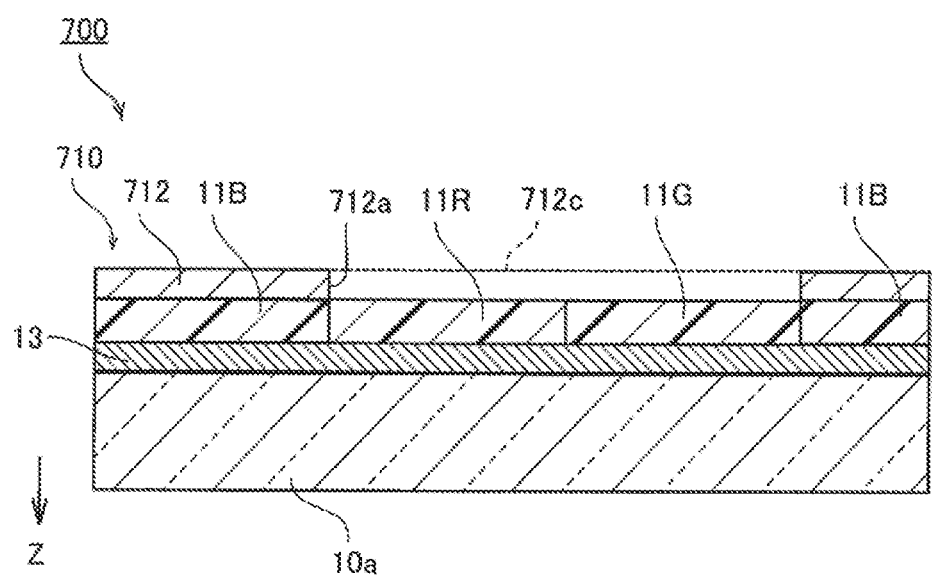
FIG. 27 is a cross-sectional view of a portion where the receiver electrode 13 of a color filter substrate 710 according to a third embodiment is disposed.

Next, a configuration of an in-cell touch panel device 700 of a third embodiment will be described with reference to FIG. 27. In the third embodiment, the gap portion 712a is formed on the green color filter 11G and the red color filter 11R. FIG. 27 is a cross-sectional view of a portion where the receiver electrode 13 of a color filter substrate 710 according to the third embodiment is disposed. As illustrated in FIG. 27, in the in-cell touch panel device 700 according to the third embodiment, at a position on the color filter substrate 710 where the receiver electrode 13 is disposed, the gap portion. 712a of the transmitter electrode 712 is continuously formed, in a portion overlapping the green color filter 11G in a plan view and a portion overlapping the red color filter 11R in a plan view. The transmitter electrode 712 is provided with a connection portion 712c for connecting a port on disposed on the plurality of blue color filters 11B at a position on the color filter substrate 710 where the receiver electrode 13 is not disposed.

According to the configuration of the third embodiment described above, green and red have higher luminosity factor than blue, so that the gap portion 712a of the transmitter electrode 712 is formed on the color filter 11 having high luminosity factor, and thus the effect of the loss of light can be further reduced. By continuously forming the gap portion 712a in a portion overlapping, the green color filter 11G in a plan view and a portion overlapping the red color filter 11R in a plan view, the configuration of the transmitter electrode 712 can be simplified as compared with a case where each gap portion is separately formed in the portion overlapping the green color filter 11G. In a plan view and the portion overlapping the red color filter 11R in a plan view. Note that other configurations and effects of the third embodiment are similar to the configurations and effects of the first embodiment.

Modifications and the Like

The above-described embodiments are merely examples for carrying out the disclosure. Accordingly, the disclosure is not limited to the embodiments described above and can be implemented by modifying the embodiments described above as appropriate without departing from the scope of the disclosure.

Figure 28:
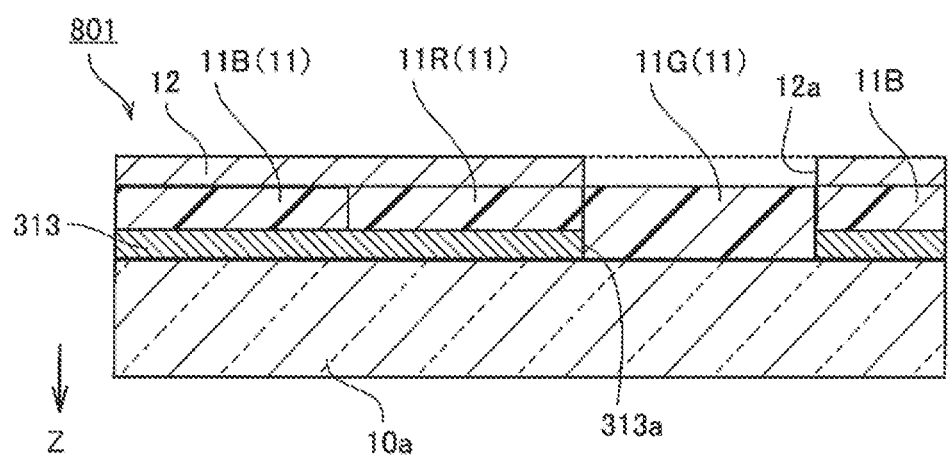
FIG. 28 is a cross-sectional view of a touch panel 801 according to a modified example of the first to third embodiments.

(1) In the first to third embodiments described above, an example is illustrated in which the cap portion is provided in the transmitter electrode, or the gap portion is provided in the receiver electrode, but the disclosure is not limited to this example. As in a touch panel 801 according to a modified example of the first to third embodiments illustrated in FIG. 28, the gap portion 12a may provided in the transmitter electrode 12, and the gap portion 313a may be provided in the receiver electrode 313.

(2) In the first to third embodiments described above, an example is illustrated in which the transmitter electrode is disposed on the upper layer of the color filter (the layer on the opposite side of the touch surface), and the receiver electrode is disposed on the lower layer of the color filter (the layer closer to the touch surface side), but the disclosure is not limited to this example. In other words, the transmitter electrode may be disposed on the lower layer of the color filter (the layer closer to the touch surface side), and the receiver electrode may be disposed on the upper layer of the color filter (the layer on the opposite side of the touch surface).

(3) In the first to third embodiments described above, an example is illustrated in which the angle formed by the direction in which the transmitter electrode or the receiver electrode extends and the direction in which the color filters are aligned is 45 degrees, 0 degrees, or 90 degrees, but the disclosure is not limited to this example. In other words, the angle formed by the direction in which the transmitter electrode or the receiver electrode extends and the direction in which the color filters are aligned may be configured to be greater than 0 degrees and smaller than 90 degrees.

(4) In the first to third embodiments described above, an example is illustrated in which the width of the receiver electrode is smaller than the width of the transmitter electrode, but the disclosure is not limited to this example. In other words, the width of the receiver electrode may be equal to the width of the transmitter electrode or more.

(5) In the first to third embodiments described above, an example is illustrated in which the transmitter wiring line and the receiver wiring line are formed on the active matrix substrate, but the disclosure is not limited to this example. In other words, the transmitter wiring line and the receiver wiring line may be formed on the color filter substrate.

(6) In the first to third embodiments described above, an example is illustrated in which the gap portion is formed in the rectangular shape in a plan view, but the disclosure is not limited to this example. In other words, the gap portion may be formed in a circular shape, an elliptical shape, or a polygonal shape in a plan view.

(7) In the first to third embodiments described above, an example is illustrated in which the memory circuit is provided in the pixel, but the disclosure is not limited to this example. In other words, the memory circuit need not necessarily be provided in the pixel.

(8) In the first to third embodiments described above, an example is illustrated in which both of the reflector and the backlight are provided in the touch panel, but the disclosure is not limited to this example. In other words, one of the reflector and the backlight need not necessarily be provided in the touch panel.

(9) In the first to third embodiments described above, an example is illustrated in which the drive signal is supplied to the transmitter electrode within the period in which the data is written into the memory circuit, but the disclosure is not limited to this example. In other words, the period in which the data is written into the memory circuit and the period in which the drive signal is supplied to the transmitter electrode may be time-divided.

(10) In the above-described first to third embodiments, an example is illustrated in which each of the number of the transmitter electrodes and the number of the receiver electrodes is five, but the disclosure is not limited to this example. Each of the number of the transmitter electrodes and the number of the receiver electrodes may be four or less, or six or more.

(11) In the first to third embodiments described above, an example is illustrated in which the touch panel has the circular shape in a plan view, but the disclosure is not limited to this example. In other words, the touch and is not limited to having the circular shape in a plan view, and may have a rectangular shape in a plan view, or may have a polygonal shape in a plan view, or may have an elliptical shape in a plan view.

(12) In the first to third embodiments described above, an example is illustrated in which the color filters adjacent to each other are in contact with each other or the gap is provided between the color filters adjacent to each other, but the disclosure is not limited to this example. For example, a black matrix may be disposed between the color filters adjacent to each other.

The in-cell touch panel described above can be described as follows.

An in-cell touch panel according to a first configuration includes a first substrate, a plural of color filters formed on the first substrate, a transmitter electrode formed on one of a layer on an opposite side of a touch surface with respect to the plurality of color filters and a layer closer to the touch surface side with respect to the plurality of color filters, a receiver electrode formed on the other the layer on the opposite side of the touch surface with respect to the plurality of color filters and the layer closer to the touch surface side with respect to the plurality of color filters, a second substrate disposed to face the first substrate and inducing a pixel electrode disposed on the second substrate wherein the plurality of color filters include a blue color filter, a red color filter, and a green color filter, and at least one of the transmitter electrode and the receiver electrode includes a first gap portion formed in at least a part portion overlapping the green color filter in a plan view (first configuration).

Here, among green, red, and blue, green has the highest luminosity factor for humans. In contrast, according to the above-described first configuration, at least one of the transmitter electrode and the receiver electrode is not provided at a position overlapping the green color filter for transmitting green. Light whose brightness and darkness are easily perceived by the humans. As a result, it is possible to reduce loss of green light whose brightness and darkness are easily perceived by the humans, and thus the in-cell touch panel capable of causing a user to feel a display bright even when a touch panel a mutual capacitance type is provided can be provided.

In the first configuration, the in-cell touch panel may further include a reflective layer formed on the second substrate and configured to reflect light incident from the first substrate side toward the first substrate side (second configuration.

Here, in a reflection type display including the reflective layer, light needs to transmit through the transmitter electrode and the receiver electrode twice when being incident and reflected, and thus a loss of light (absorption or scatter) increases as compared with that the transmission type. Thus, according to the second configuration described above, even when the reflective layer is provided, the loss of green light can be reduced, and this can cause the user to feel the display bright.

In the first or second configuration, at least one of the transmitter electrode and the receiver electrode may further include a second gap portion formed in at least a part of a portion overlapping the red color filter in a plan view (third configuration).

According to the third configuration described above, green and red have higher luminosity factor than blue, and thus the loss of red light can be reduced in addition to green light. This can consequently cause the user to feel the display further bright even when the touch panel of the mutual capacitance type is provided.

In the third configuration, the first gap portion may be formed continuously with the second gap portion (fourth configuration).

According to the fourth configuration described above, the configuration of at least one of the transmitter electrode and the receiver electrode can be simplified as compared with a case where the first gap portion and the second gap portion are formed separately.

In any one of the first to fourth configurations, at least one of the transmitter electrode and the receiver electrode may further include an inter-filter gap portion formed in a portion overlapping a space between adjacent ones of the plurality of color filters in a plan view (fifth configuration).

Here, in a case where a gap is formed between the adjacent ones of the color filters, the transmitter electrode and the receiver electrode may be short-circuited via the gap. In contrast, according to the fifth configuration described above, the inter-filter gap portion can prevent the transmitter electrode and the receiver electrode from being short-circuited.

In the fifth configuration, the first gap portion may be formed continuously with the inter-filter gap portion (sixth configuration).

According to the sixth configuration described above, the configuration of at least one of the transmitter electrode and the receiver electrode can be simplified as compared with a case where the first gap portion and the inter-filter gap portion are formed separately.

In the configuration of any one of the first to sixth configurations, the in-cell touch panel may further include an overcoat film formed on a layer on an opposite side of the touch surface with respect to the plurality of color filters, and a common electrode formed on a layer on an opposite side of the touch surface with respect to the overcoat film, wherein the transmitter electrode may be formed on a layer on an opposite side of the touch surface with respect to the plurality of color filters and closer to the touch surface with respect to the overcoat film, and the receiver electrode may be formed on a layer closer to the touch surface side with respect to the plurality of color filters (seventh configuration).

Here, the vertical alignment (VA) type is known in which a common electrode is formed on a first substrate on which a color filter is formed, and an electric field is generated between the common electrode and a pixel electrode formed closer to the touch surface side with respect to the second substrate, and thus a display is driven. In this case, in a case where at least one of the transmitter electrode or the receiver electrode is formed closer to the second substrate side (layer on the opposite side of the touch surface) with respect to the common electrode, the electric field formed between the transmitter electrode or the receiver electrode formed on the layer on an opposite side of the touch surface and the pointer is shielded by the common electrode. In contrast, according to the seventh configuration described above, the common electrode is formed on the layer on the opposite side of the touch surface with respect to the transmitter electrode and the receiver electrode, and thus the electric field formed between the transmitter electrode or the receiver electrode and the pointer can be prevented from being shielded by the common electrode. As a result, even when the display is driven by the VA type, the in-cell touch panel can be provided.

In any one of the first to seventh configurations, the receiver electrode may be formed to extend in a direction intersecting the direction in which the transmitter electrode extends, and the width of the receiver electrode may be smaller than the width of the transmitter electrode (eighth configuration).

According to the eighth configuration described above, the width of the receiver electrode is small, and thus a coupling capacitance (load capacity) between the transmitter electrode and the receiver electrode can be reduced. As a result, a decrease of the signal from the receiver electrode due to the coupling capacitance can be prevented.

In any one of the first to eighth configurations, the plurality of color filters may be disposed side by side in a first direction, the transmitter electrode may be formed to extend in a direction intersecting the first direction, and the receiver electrode may be formed to extend in a direction intersecting the first direction and in a direction intersecting a direction in which the transmitter electrode extends (ninth configuration). In the ninth configuration, the in-cell touch panel may further include a transmitter terminal and a receiver terminal formed in one portion in a second direction orthogonal to a first direction of any one of the first substrate or the second substrate, a transmitter wiring line connected to one end portion of the transmitter electrode in the second direction, the transmitter wiring line being connected to the transmitter terminal, and a receiver wiring line connected to one end portion of the receiver electrode in the second direction, the receiver wiring line being connected to the receiver terminal (tenth configuration).

According to the ninth and tenth configurations described above, the transmitter wiring line and the receiver wiring line are both drawn to one side, and thus a space in which other components can be disposed can be formed in a portion closer to the other side with respect to the first substrate.

In any one of the first to tenth configurations, the plurality of color filters may be disposed side by side in a first direction, the transmitter electrode may be formed to extend in a direction orthogonal to the first direction, and the receiver electrode may be formed to extend parallel to the first direction (eleventh configuration).

According to the eleventh configuration described above, the first gap portion can be easily formed at t position where the transmitter electrode and the receiver electrode intersect with each other in plan view and a position overlapping the green color filter in a plan view.

In any one of the ninth to eleventh configurations, the first gap portion may be formed in a portion overlapping the green color filter and the receiver electrode in a plan view in the transmitter electrode (twelfth configuration).

According to the twelfth configuration described above, in a case where the transmitter electrode is formed to extend orthogonal to a direction in which the plurality of color filters are aligned, the first gap portion is formed in the transmitter electrode, and thus the loss of green bright can be reduced, and this can cause the user to feel the display bright even when the touch panel of the mutual capacitance type provided.

In the seventh or eighth configuration, the plurality of color filters may be disposed side by side in a first direction, the transmitter electrodes may be formed to extend parallel to the first direction, the receiver electrodes may be formed to extend in a direction orthogonal to the first direction, and the first gap portion may be formed in a portion overlapping the green color filter in a plan view in the receiver electrode (thirteenth configuration).

According to the thirteenth configuration described above, in a case where the transmitter electrode is formed to extend in the direction in which the plurality of color filters are aligned, a gap portion is formed in the receiver electro and thus the loss of green light can be reduced, and this can cause the user to feel the display Alright even when the touch panel of the mutual capacitance type is provided.

In any one of the first to thirteenth configurations, the in-cell touch panel may further include an overcoat film formed on a layer on an opposite side of the touch surface with respect to the plurality of color filters, wherein the overcoat film may include a contact hole in which a connection conductor connected to the transmitter electrode or the receiver electrode is formed on an inner side surface of the contact hole, and the in-cell touch panel may further include a wiring line section made of metal formed on the second substrate, wherein the connection conductor may be connected to the wiring line section of the metal (fourteenth configuration).

According to the fourteenth configuration described above, wiring line resistance can be reduced by using the wiring line section of the metal having a smaller resistance value than the transparent electrode. As a result, influences of the wiring line resistance on the signal to the transmitter electrode and the signal from the receiver electrode can be reduced.

Furthermore, even when the drive circuit is provided on the second substrate, the transmitter electrode or the receiver electrode can be easily connected to the drive circuit by using the connection conductor in the contact hole and the wiring line section made of the metal.

In the configuration of any one of the first to fourteenth configurations, the in-cell touch panel may further include a memory circuit disposed on the second substrate and connected to the pixel electrode, and a drive circuit for supplying a drive signal to the transmitter electrode, wherein the drive circuit may be configured to supply the drive signal to the transmitter electrode within a period in which data is written into the memory circuit (fifteenth configuration).

According to the fifteenth configuration described above, the period in which the data is written into the memory circuit and the period for supplying the drive signal to the transmitter electrode do not need to be time-divided. As a result, it is not necessary to design the drive circuit in accordance with the in-cell touch panel including the memory circuit, and thus a general-purpose drive circuit can be used, and versatility of the in-cell touch panel can be improved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An in-cell touch panel comprising:
a first substrate;
a plurality of color filters formed on the first substrate;
a transmitter electrode formed on one of a layer on an opposite side of a touch surface with respect to the plurality of color filters and a layer closer to a touch surface side with respect to the plurality of color filters;
a receiver electrode formed on the other one of the layer on the opposite side of the touch surface with respect to the plurality of color filters and the layer closer to the touch surface side with respect to the plurality of color filters; and
a second substrate disposed to face the first substrate and including a pixel electrode disposed on the second substrate,
wherein the plurality of color filters includes a blue color filter, a red color filter, and a green color filter,
both the transmitter electrode and the receiver electrode are disposed in a part of a portion overlapping the blue color filter in a plan view,
at least one of the transmitter electrode and the receiver electrode includes a first gap portion formed in at least a part of a portion overlapping the green color filter in the plan view, and
the first gap portion is not formed in the part of the portion overlapping the blue color filter in the plan view.

2. The in-cell touch panel according to claim 1, further comprising:
a reflective layer formed on the second substrate and configured to reflect light.

3. The in-cell touch panel according to claim 1,
wherein at least one of the transmitter electrode and the receiver electrode further includes a second gap portion formed in at least a part of a portion overlapping the red color filter in the plan view.

4. The in-cell touch panel according to claim 3,
wherein the first gap portion is formed continuously along the second gap portion.

5. The in-cell touch panel according to claim 1,
wherein at least one of the transmitter electrode and the receiver electrode further includes an inter-filter gap portion formed in a portion overlapping a space between adjacent ones of the plurality of color filters in the plan view.

6. The in-cell touch panel according to claim 5,
wherein the first gap portion is formed continuously along the inter-filter gap portion.

7. The in-cell touch panel according to claim 1, further comprising:

an overcoat film formed on a layer on an opposite side of the touch surface with respect to the transmitter electrode; and a common electrode formed on a layer on an opposite side of a touch surface with respect to the overcoat film, wherein the transmitter electrode is formed on the layer on the opposite side of the touch surface with respect to the plurality of color filters and closer to the touch surface with respect to the overcoat film, and the receiver electrode is formed on the layer closer to the touch surface side with respect to the plurality of color filters.

8. The in-cell touch panel according to claim 7, wherein the plurality of color filters is disposed side by side in a first direction, the transmitter electrode extends parallel to the first direction, the receiver electrode extends in a second direction orthogonal to the first direction, and the first gap portion is formed in the receiver electrode in the portion overlapping the green color filter in the plan view.

9. The in-cell touch panel according to claim 1, wherein the receiver electrode extends in a direction intersecting a direction in which the transmitter electrode extends, and a width of the receiver electrode is smaller than a width of the transmitter electrode.

10. The in-cell touch panel according to claim 1, wherein the plurality of color filters is disposed side by side in a first direction, the transmitter electrode extends in a second direction intersecting the first direction, and the receiver electrode extends in a third direction intersecting the first direction and the second direction.

11. The in-cell touch panel according to claim 10, wherein the first gap portion is formed in the transmitter electrode in a portion overlapping the green color filter and the receiver electrode in the plan view.

12. The in-cell touch panel according to claim 1, wherein the plurality of color filters is disposed side by side in a first direction, the transmitter electrode extends in a second direction orthogonal to the first direction, and the receiver electrode extends parallel to the first direction.

13. The in-cell touch panel according to claim 1, further comprising:

an overcoat film formed on the layer on the opposite side of the touch surface with respect to the plurality of color filters, the overcoat film including a contact hole and a connection conductor, connected to the transmitter electrode or the receiver electrode, being formed on an inner side surface of the contact hole; and a wiring line section made of metal and formed on the second substrate, wherein the connection conductor is connected to the wiring line section.

14. The in-cell touch panel according to claim 1, further comprising:

a memory circuit disposed on the second substrate and connected to the pixel electrode; and a drive circuit configured to supply a drive signal to the transmitter electrode, wherein the drive circuit is configured to supply the drive signal to the transmitter electrode within a period of data being written into the memory circuit.

15. An in-cell touch panel comprising:

a first substrate;

a plurality of color filters formed on the first substrate;

a transmitter electrode formed on one of a layer on an opposite side of a touch surface with respect to the plurality of color filters and a layer closer to a touch surface side with respect to the plurality of color filters;

a receiver electrode formed on the other one of the layer on the opposite side of the touch surface with respect to the plurality of color filters and the layer closer to the touch surface side with respect to the plurality of color filters; and a second substrate disposed to face the first substrate and including a pixel electrode disposed on the second substrate, wherein the plurality of color filters includes a blue color filter, a red color filter, and a green color filter, at least one of the transmitter electrode and the receiver electrode includes a first gap portion formed in at least a part of a portion overlapping the green color filter in a plan view, the plurality of color filters is disposed side by side in a first direction, the transmitter electrode extends in a second direction intersecting the first direction, and the receiver electrode extends in a third direction intersecting the first direction and the second direction, the in-cell touch panel further comprising:

a transmitter terminal and a receiver terminal formed in one portion in a fourth direction orthogonal to the first direction of any one of the first substrate or the second substrate;

a transmitter wiring line connected to one end portion of the transmitter electrode in the fourth direction, the transmitter wiring line being connected to the transmitter terminal; and a receiver wiring line connected to one end portion of the receiver electrode in the fourth direction, the receiver wiring line being connected to the receiver terminal.

* * * * *